United States Patent
Harada et al.

(10) Patent No.: US 7,317,481 B2
(45) Date of Patent: Jan. 8, 2008

(54) IMAGE DATA CORRECTION PROCESSING BASED ON SENSITIVITY

(75) Inventors: Osamu Harada, Kanagawa (JP); Hiromichi Sakamoto, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 770 days.

(21) Appl. No.: 10/370,972

(22) Filed: Feb. 20, 2003

(65) Prior Publication Data
US 2003/0179302 A1 Sep. 25, 2003

(30) Foreign Application Priority Data
Feb. 20, 2002 (JP) .............................. 2002-042933
Mar. 8, 2002 (JP) .............................. 2002-064086

(51) Int. Cl.
*H04N 9/64* (2006.01)
*H04N 5/217* (2006.01)
(52) U.S. Cl. ...................................... 348/243; 348/241
(58) Field of Classification Search ................ 348/241, 348/243, 252, 254, 255, 251
See application file for complete search history.

(56) References Cited

U.S. PATENT DOCUMENTS

| 5,805,300 | A | * | 9/1998 | Fukushima | 358/404 |
| 6,525,769 | B1 | * | 2/2003 | Thomas et al. | 348/243 |
| 6,982,756 | B2 | * | 1/2006 | Nakamura | 348/241 |
| 2002/0015111 | A1 | * | 2/2002 | Harada | 348/642 |
| 2002/0085105 | A1 | * | 7/2002 | Sohn | 348/294 |
| 2002/0089707 | A1 | * | 7/2002 | Yasuda | 358/521 |
| 2004/0032490 | A1 | * | 2/2004 | Uchida | 348/96 |

FOREIGN PATENT DOCUMENTS

| JP | 2001-016509 | * | 1/2001 |
| JP | 2001-057656 | * | 2/2001 |

\* cited by examiner

*Primary Examiner*—Lin Ye
*Assistant Examiner*—Kelly Jerabek
(74) *Attorney, Agent, or Firm*—Morgan & Finnegan LLP

(57) ABSTRACT

A signal processing device includes a memory which stores correction data in advance. The signal processing device modifies the correction data stored in the memory on the basis of an image sensing signal obtained by causing an image sensing unit to perform image sensing operation in a non-exposure state. The signal processing device corrects by using the modified correction data an image sensing signal obtained by causing the image sensing unit to perform image sensing operation in an exposure state.

9 Claims, 13 Drawing Sheets

IMAGE DATA CORRECTION PROCESSING BASED ON SENSITIVITY

FIELD OF THE INVENTION

The present invention relates to correction processing and control such as shading correction performed on image data obtained from an image sensing device.

BACKGROUND OF THE INVENTION

Image processing apparatuses such as an electronic camera which uses a memory card having a solid-state memory element as a recording medium, and records and plays back still and moving images sensed by a solid-state image sensing device (to be described as an image sensing device hereinafter) such as a CCD or CMOS have commercially been available. This image processing apparatus such as an electronic camera allows the photographer to select a single-shot/sequential image sensing mode from the operation unit. The photographer can switch image sensing between single-shot image sensing for sensing an image for each frame every time he/she presses the shutter button and sequential image sensing for sequentially sensing images while he/she keeps pressing the shutter button.

To sense an image by using the image sensing device such as a CCD or CMOS, the image processing apparatus can execute dark noise correction processing by calculation processing using dark image data read out after charge accumulation similar to actual image sensing while the image sensing device is not exposed, and image data of actual image sensing read out after charge accumulation while the image sensing device is exposed. A high-quality image can be attained by correcting the sensed image data for image quality degradation caused by dark current noise generated by the image sensing device, a defective pixel due to a slight scratch unique to the image sensing device, or the like. However, in order to cause the image processing apparatus to perform dark noise correction processing, a dark image must be sensed. This increases the release time lag, missing a good opportunity of capturing an image.

To solve this problem, there is known an image processing apparatus which uses correction data stored in advance to cancel the horizontal shading (luminance level nonuniformity) of the image sensing device or a noise component (offset from a proper dark level) such as a dark current, and can sense a high-quality image while suppressing the release time lag small.

The correction data stored in advance is an offset amount for canceling the horizontal shading of the image sensing device, or the difference between a proper dark level and image data obtained by performing dark image sensing but not performing correction using correction data in assembling an image processing apparatus. The dark level serves as a criterion for the luminance component and color components of image data in image processing. The image quality can therefore be improved by correcting the dark level of image data obtained by exposing the image sensing device.

The prior art suffers the following problems. Some image sensing devices nonlinearly change the dark current noise state depending on the temperature characteristic of an output circuit. In an image processing apparatus having such an image sensing system, a noise component which should be canceled remains in sensed image data even by using a correction value stored in advance, degrading the image quality. In this case, correction by calculation using a temperature coefficient complicates the calculation. Calculation processing takes a long time in the presence of many pixels, increasing the release time lag. A correction value may be stored in advance for each temperature region, which requires a larger memory capacity and makes the apparatus bulky.

In addition to dark noise correction processing, the image processing apparatus can execute shading correction processing by calculation processing using shading correction data stored in advance in a storage medium, and sensed image data read out after charge accumulation while the image sensing device is exposed. Noise generated in an image sensing circuit system, i.e., the voltage nonuniformity caused by the resistance component of the power line in a sensor, and shading by element variations or the like can be reduced, sensing a high-quality image.

However, the prior art poses the following problems. In a conventional image processing apparatus such as an electronic camera, shading correction data is stored in a storage medium in advance. In image sensing, the shading correction data is read out from the storage medium, and calculation processing is performed using the shading correction data and sensed image data, achieving shading correction. If the change of the shading amount depending on image sensing conditions is not considered, appropriate shading correction cannot be done, and the image quality may degrade. If the change of the shading amount depending on image sensing conditions is considered, the number of shading correction data corresponding to respective image sensing conditions must be stored in the storage medium, which requires a large-capacity storage medium.

SUMMARY OF THE INVENTION

The present invention has been made in consideration of the above situation, and has as its object to properly correct the noise and shading of a sensed image.

According to the present invention, the foregoing object is attained by providing an apparatus comprising:

(A) a memory adapted to store correction data;

(B) a signal processing device adapted to modify the correction data stored in the memory by using an image sensing signal obtained by causing an image sensing unit to perform image sensing operation in a non-exposure state, and adapted to correct by using the modified correction data an image sensing signal obtained by causing the image sensing unit to perform image sensing operation in an exposure state.

According to the present invention, the foregoing object is also attained by providing an apparatus comprising:

(A) a memory adapted to store shading correction data;

(B) a signal processing device adapted to modify the shading correction data stored in the memory in accordance with an image sensing condition and correct an image sensing signal by using the modified shading correction data.

According to the present invention, the foregoing object is also attained by providing an image processing method comprising modifying correction data stored in a memory by using an image sensing signal obtained by causing an image sensing unit to perform image sensing operation in a non-exposure state, and correcting by using the modified correction data an image sensing signal obtained by causing the image sensing unit to perform image sensing operation in an exposure state.

According to the present invention, the foregoing object is also attained by providing an image processing method comprising modifying shading correction data stored in a memory in accordance with an image sensing condition, and correcting an image sensing signal by using the modified shading correction data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 12A to 12C are graphs for explaining shading correction data calculation processing according to the second embodiment of the present invention, in which FIG. 12A shows shading correction data at a reference ISO sensitivity, FIG. 12B shows gain-converted shading correction data, and FIG. 12C shows offset-converted shading correction data.

DETAILED DESCRIPTION OF THE PREFERRED EMBODIMENTS

Preferred embodiments of the present invention will be described in detail in accordance with the accompanying drawings.

<First Embodiment>

Figure 1:
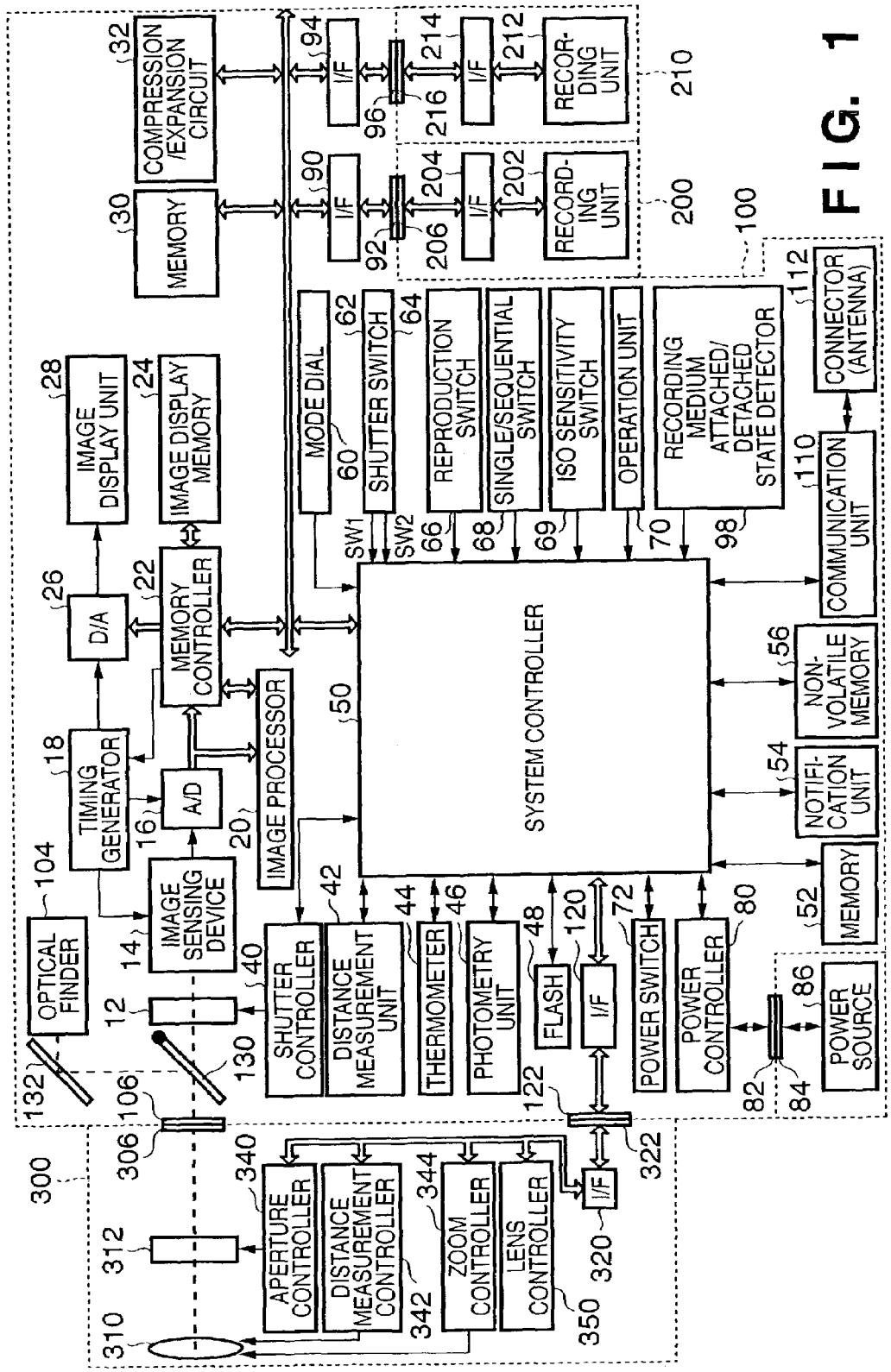
FIG. 1 is a block diagram showing the configuration of an image processing apparatus according to embodiments of the present invention.

FIG. 1 is a block diagram showing the configuration of an image processing apparatus according to the first embodiment of the present invention. The image processing apparatus comprises an image processing apparatus (main body) 100, recording media 200 and 210 detachably mounted in the image processing apparatus main body 100, and a lens unit 300 detachably mounted on the image processing apparatus main body 100.

In the image processing apparatus 100, a shutter 12 controls the exposure amount to an image sensing device 14. The image sensing device 14 converts an optical image of an object into an electrical signal. The image processing apparatus 100 of the first embodiment has the first image sensing mode in which charges are accumulated without exposing the image sensing device 14, and the second image sensing mode in which charges are accumulated while the image sensing device 14 is exposed. In a single-lens reflex camera, light incident on a lens 310 of the lens unit 300 is guided via a stop 312, a lens mount 306, and a lens mount 106, a mirror 130, and the shutter 12 of the image processing apparatus 100, forming an optical image on the image sensing device 14. An A/D converter 16 converts an analog signal output from the image sensing device 14 into a digital signal. A timing generator 18 supplies a clock signal and control signal respectively to the image sensing device 14, the A/D converter 16, and a D/A converter 26 under the control of a memory controller 22 and a system controller 50.

An image processor 20 performs predetermined pixel interpolation processing and color conversion processing on data from the A/D converter 16 or data from the memory controller 22. If necessary, the image processor 20 performs predetermined calculation processing using sensed image data, and the system controller 50 performs TTL (Through-The-Lens) AF (Auto Focus) processing, AE (Auto Exposure) processing, and EF (pre-flash) processing with respect to a shutter controller 40 and a distance measurement unit 42 on the basis of the result of calculations. Further, the image processor 20 performs predetermined calculation processing using sensed image data, and performs TTL AWB (Auto White Balance) processing on the basis of the result of calculations.

In the first embodiment, the image processing apparatus 100 comprises the dedicated distance measurement unit 42 and a dedicated photometry unit 46. It is also possible to perform AF processing, AE processing, and EF processing by using the distance measurement unit 42 and photometry unit 46, and not to perform AF processing, AE processing, and EF processing by using the image processor 20. It is also possible to perform AF processing, AE processing, and EF processing by using the distance measurement unit 42 and photometry unit 46, and further to perform AF processing, AE processing, and EF processing by using the image processor 20.

The memory controller 22 controls the A/D converter 16, the timing generator 18, the image processor 20, an image display memory 24, the D/A converter 26, a memory 30, and a compression/expansion circuit 32. Data from the A/D converter 16 is written into the image display memory 24 or memory 30 via the image processor 20 and memory controller 22, or directly via the memory controller 22. The image display memory 24 stores display image data. The D/A converter 26 converts a digital signal output from the memory controller 22 into an analog signal.

An image display unit 28 comprises a TFT LCD or the like. Display image data written in the image display memory 24 is displayed on the image display unit 28 via the D/A converter 26. An electronic finder function can be realized by sequentially displaying sensed image data on the image display unit 28. Further, the image display unit 28 arbitrarily turns ON/OFF its display in accordance with an instruction from the system controller 50. If the display is turned OFF, the electric consumption of the image processing apparatus 100 can be greatly reduced.

The memory 30, used for storing sensed still images and moving images, has a sufficient storage capacity for storing a predetermined number of still images and a moving image for a predetermined period. In sequential image sensing to sequentially sense a plurality of still images or in panoramic image sensing, a large number of images can be written into the memory 30 at a high speed. The memory 30 may be used as a work area for the system controller 50. The compression/expansion circuit 32 compresses or expands image data by adaptive discrete cosine transformation (ADCT) or the like. The compression/expansion circuit 32 reads out an image stored in the memory 30, performs compression or expansion processing on the read image, and writes the processed data into the memory 30.

Based on photometry information from the photometry unit 46, the shutter controller 40 controls the shutter 12 in association with a stop controller 340 which controls the stop 312 of the lens unit 300. The distance measurement unit 42 performs AF processing. Light incident on the lens 310 of the lens unit 300 is guided to enter the distance measurement unit 42 via the stop 312, the lens mount 306, and the lens mount 106, mirror 130, and distance measurement sub-mirror (not shown) of the image processing apparatus 100 in a single-lens reflex camera, thereby measuring the focus state of an image formed as an optical image. A thermometer 44 can detect the temperature of the image sensing environment. When the thermometer 44 is incorporated in the sensor (image sensing device 14), the dark current of the sensor can be more accurately expected.

The photometry unit 46 performs AE (Auto Exposure) processing. Light incident on the lens 310 of the lens unit 300 is guided to enter the photometry unit 46 via the stop 312, the lens mount 306, and the lens mount 106, the mirror 130, a mirror 132, and a photometry lens (not shown) of the image processing apparatus 100 in a single-lens reflex camera, thereby measuring the exposure state of an image formed as an optical image. The photometry unit 46 has an EF processing function in association with a flash 48. The flash 48 has an AF auxiliary light projection function and a flash adjusting function.

The system controller 50 can also perform exposure control and AF control by the video TTL method of controlling the shutter controller 40, the stop controller 340, and a distance measurement controller 342, on the basis of the result of calculations by the image processor 20 for image data sensed by the image sensing device 14. AF control may be performed using both the result of measurements by the distance measurement unit 42 and the result of calculations by the image processor 20 for image data sensed by the image sensing device 14. Exposure control may be done using both the result of measurements by the photometry unit 46 and the result of calculations by the image processor 20 for image data sensed by the image sensing device 14.

The system controller 50 controls the overall image processing apparatus 100, and executes the processing of each flow chart to be described later on the basis of an internal program stored in, e.g., a memory 52 in the image processing apparatus 100 or an external program supplied to the image processing apparatus 100. The memory 52 stores constants, variables, programs, and the like for operating the system controller 50. A notification unit 54 comprises a liquid crystal display device and loudspeaker which display and output operating statuses, messages, and the like by using characters, images, sound, and the like in accordance with execution of a program by the system controller 50. One or a plurality of notification units 54 are arranged at easy-to-see positions near the operation unit of the image processing apparatus 100, and formed from a combination of LCDs, LEDs, sound generating devices, and the like. Some functions of the notification unit 54 are provided within an optical finder 104.

The display contents of the notification unit 54, displayed on the LCD or the like, include indication of single-shot/sequential image sensing, a self timer, a compression ratio, an ISO (International Organization for Standardization) sensitivity, the number of recording pixels, the number of recorded images, the number of recordable images, a shutter speed, an f-number, exposure compensation, flash illumination, pink-eye effect mitigation, macro image sensing, a buzzer-set state, a remaining timer battery level, a remaining battery level, an error state, information of plural digit numbers, the attached/detached status of the recording media 200 and 210, the attached/detached status of the lens unit 300, the operation of a communication I/F, date and time, and a connection state to an external computer.

Further, the display contents of the notification unit 54, displayed within the optical finder 104, include a focus state, an image sensing "ready" state, a camera shake warning, a flash charge state, a flash charge completion state, a shutter speed, an f-number, exposure compensation, and write operation into a recording medium. The display contents of the notification unit 54, displayed on the LED or the like, include a focus state, an image sensing "ready" state, a camera shake warning, a flash charge state, a flash charge completion state, write operation into a recording medium, a macro image sensing setting notification, and a secondary battery charge state. The display contents of the notification unit 54, displayed on the lamp or the like, include a self-timer notification lamp. The self-timer notification lamp may also be used for AF auxiliary light.

A nonvolatile memory 56 is an electrically erasable and recordable memory such as an EEPROM. The nonvolatile memory 56 stores various parameters, set values such as the ISO sensitivity, set modes, and one-dimensional correction data used for horizontal dark shading correction. One-dimensional correction data is created and written in adjustment during the manufacturing process of the image processing apparatus.

Operation means 60, 62, 64, 66, 68, 69, and 70 are used to input various operation instructions to the system controller 50, and comprise one or a plurality of combinations of switches, dials, touch panels, a device for pointing by line-of-sight detection, a voice recognition device, and the like. These operation means will be described in detail.

The mode dial switch 60 allows switching and setting function image sensing modes such as an automatic image sensing mode, a programmed image sensing mode, a shutter speed priority image sensing mode, a stop priority image sensing mode, a manual image sensing mode, a focal depth priority (depth) image sending mode, a portrait image sensing mode, landscape image sensing mode, a close-up image sensing mode, a sports image sensing mode, a night view image sensing mode, and a panoramic image sensing mode. The shutter switch SW1 62 is turned ON by half stroke of the shutter button (not shown) to designate the start of the operations of AF processing, AE processing, AWB processing, and EF processing.

The shutter switch SW2 64 is turned ON by full stroke of the shutter button (not shown) to designate the start of a series of processing operations: exposure processing to write a signal read from the image sensing device 14 into the memory 30 via the A/D converter 16 and memory controller 22; development processing by using calculations by the image processor 20 and memory controller 22; and recording processing to read out image data from the memory 30, compress the image data by the compression/expansion circuit 32, and write the image data into the recording medium 200 or 210. The playback switch 66 designates the start of playback operation to read out a sensed image from the memory 30 or the recording medium 200 or 210 in an image sensing mode and display the image on the image display unit 28.

The single-shot/sequential image sensing switch 68 allows setting a single-shot image sensing mode in which an image of one frame is sensed and then the device stands by when the shutter switch SW2 64 is pressed, and a sequential image sensing mode in which images are sequentially sensed while the shutter switch SW2 64 is kept pressed. The ISO sensitivity setting switch 69 enables setting an ISO sensitivity (image sensing sensitivity) by changing the gain setting in the image sensing device 14 or image processor 20.

The operation unit 70 comprises various buttons and touch panels including a menu button, a set button, a macro button, a multi-image reproduction/repaging button, flash set button, a single-shot/sequential/self-timer image sensing switching button, a forward (+) menu item selection button, a backward (−) menu item selection button, a forward (+) reproduction image search button, a backward (−) reproduction image search button, an image sensing quality selection button, an exposure correction button, a date/time set button, a selection/switching button for selecting and switching various functions in executing image sensing and reproduction in a panoramic mode or the like, a determination/execution button for setting determination and execution of various functions in executing image sensing and reproduction in a panoramic mode or the like, an image display ON/OFF switch to set the ON/OFF state of the image display unit 28, and a quick review ON/OFF switch to set a quick review function of automatically reproducing sensed image data immediately after image sensing.

The operation unit 70 also comprises a compression mode switch to select the compression ratio of JPEG (Joint Photographic Experts Group) compression or select a CCDRAW mode in which a signal from the image sensing device 14 is directly digitized and recorded on a recording medium, a reproduction switch capable of setting function modes such as a reproduction mode, multi-image reproduction/erase mode, and PC (Personal Computer) connection mode, and an AF mode set switch capable of setting a one-shot AF mode in which, if the shutter switch SW1 62 is pressed, auto focus operation starts and once the image is in focus, the focus state is maintained, and a servo AF mode in which auto focus operation is kept performed while the shutter switch SW1 is kept pressed. With a rotary dial switch, numerical values and functions can be more easily selected for the "+" and "−" buttons.

A power switch 72 allows switching and setting the power ON/OFF mode of the image processing apparatus 100. The power switch 72 also allows switching and setting the power ON/OFF settings of various accessory devices including the lens unit 300, external flash (not shown), and recording media 200 and 210 which are connected to the image processing apparatus 100. A power controller 80 comprises a battery detection circuit, a DC/DC converter, a switch circuit to switch a block to be energized, and the like. The power controller 80 detects the attached/detached state of the battery, a battery type, and a remaining battery power level, controls the DC/DC converter based on the results of detection and an instruction from the system controller 50, and supplies a necessary voltage to the respective parts including the recording media 200 and 210 for a necessary period. Connectors 82 and 84 connect the power controller 80 and a power source 86. The power source 86 comprises a primary battery such as an alkaline battery or lithium battery, a secondary battery such as an NiCd battery, NiMH battery, or Li battery, an AC adaptor, and the like.

Interfaces 90 and 94 interface the recording media 200 and 210 such as a memory card and hard disk. Connectors 92 and 96 connect the image processing apparatus 100 and the recording media 200 and 210 such as a memory card and hard disk. A recording medium attached/detached state detector 98 detects whether the recording medium 200 and/or 210 is attached to the connector 92 and/or 96.

In the first embodiment, two systems of interfaces and connectors for connection with the recording medium are employed. However, one or a plurality of systems of interfaces and connectors for connection with the recording medium may be provided. Further, interfaces and connectors pursuant to different standards may be combined. As the interfaces and connectors, cards in conformity with PCM-CIA (Personal Computer Memory Card International Association) card standards and cards in conformity with CF (Compact Flash®) card standards may be used.

In a case where cards and connectors in conformity with the PCMCIA standards, CF (Compact Flash®) card standards, and the like are used as the interfaces 90 and 94 and the connectors 92 and 96, image data and management information attached to the image data can be transferred between the image processing apparatus and other peripheral devices such as a computer and printer by connecting various communication cards such as a LAN card, modem card, USB (Universal Serial Bus) card, IEEE (Institute of Electrical and Electronics Engineers) 1394 card, P1284 card, SCSI (Small Computer System Interface) card, and PHS (Personal Handyphone System) card.

The optical finder 104 can receive light incident on the lens 310 of the lens unit 300 via the stop 312, the lens mount 306, and the lens mount 106 and mirrors 130 and 132 of the image processing apparatus 100 in a single-lens reflex camera, forming and displaying an image as an optical image. An image can be sensed by using only the optical finder 104 without using any electronic finder function on the image display unit 28.

A communication unit 110 has various communication functions for RS232C, USB, IEEE 1394, P1284, SCSI, modem, LAN, and wireless communication. A connector/antenna 112 functions as a connector when the image processing apparatus 100 is connected to another device via the communication unit 110, and as an antenna for wireless communication. An interface 120 connects the image processing apparatus 100 to the lens unit 300 at the lens mount 106.

A connector 122 electrically connects the image processing apparatus 100 to the lens unit 300. A lens attached/detached state detector 124 detects whether the lens unit 300 is mounted on the lens mount 106 and/or connector 122. The connector 122 transfers a control signal, state signal, data signal, and the like between the image processing apparatus 100 and the lens unit 300, and also has a function of supplying currents of various voltages. The connector 122 may perform not only electrical communication but also optical communication and sound communication. The mirrors 130 and 132 can guide light incident on the lens 310 to the optical finder 104 in a single-lens reflex camera. Note that the mirror 132 may be a quick-return mirror or half-mirror.

The recording medium 200 comprises a memory card, hard disk, or the like. The recording medium 200 has a recording unit 202 of a semiconductor memory, magnetic disk, or the like, an interface 204 for the image processing apparatus 100, and a connector 206 for connection with the image processing apparatus 100. Also, the recording medium 210 comprises a memory card, hard disk, or the like. The recording medium 210 has a recording unit 212 of a semiconductor memory, magnetic disk, or the like, an interface 214 for the image processing apparatus 100, and a connector 216 for connection with the image processing apparatus 100.

The lens unit 300 is of interchangeable lens type. The lens mount 306 mechanically couples the lens unit 300 to the image processing apparatus 100. The lens mount 306 incorporates various functions for electrically connecting the lens unit 300 to the image processing apparatus 100. The image sensing lens 310 transmits an object image. The stop 312 adjusts the quantity of light entering from the image sensing lens 310. An interface 320 interfaces the lens unit 300 to the image processing apparatus 100 within the lens mount 306. A connector 322 electrically connects the lens unit 300 to the image processing apparatus 100. The connector 322 transfers a control signal, state signal, data signal, and the like between the image processing apparatus 100 and the lens unit 300, and also has a function of receiving or supplying currents of various voltages. The connector 322 may perform not only electrical communication but also optical communication and audio communication.

The stop controller 340 controls the stop 312 on the basis of photometry information from the photometry unit 46 of the image processing apparatus 100 in association with the shutter controller 40 which controls the shutter 12. The distance measurement controller 342 controls focusing of the image sensing lens 310. A zoom controller 344 controls zooming of the image sensing lens 310. A lens system controller 350 controls the whole lens unit 300. The lens system controller 350 has as a memory which stores operation constants, variables, programs, and the like, and a nonvolatile memory which holds identification information such as a number unique to the lens unit 300, management information, pieces of function information such as a full-aperture f-number, minimum f-number, and focal length, and current and past set values.

The operation of the image processing apparatus 100 with the above arrangement according to the first embodiment will be described in detail below with reference to FIGS. 1 to 6.

<Whole Processing of Image Processing Apparatus 100>

Figure 2:
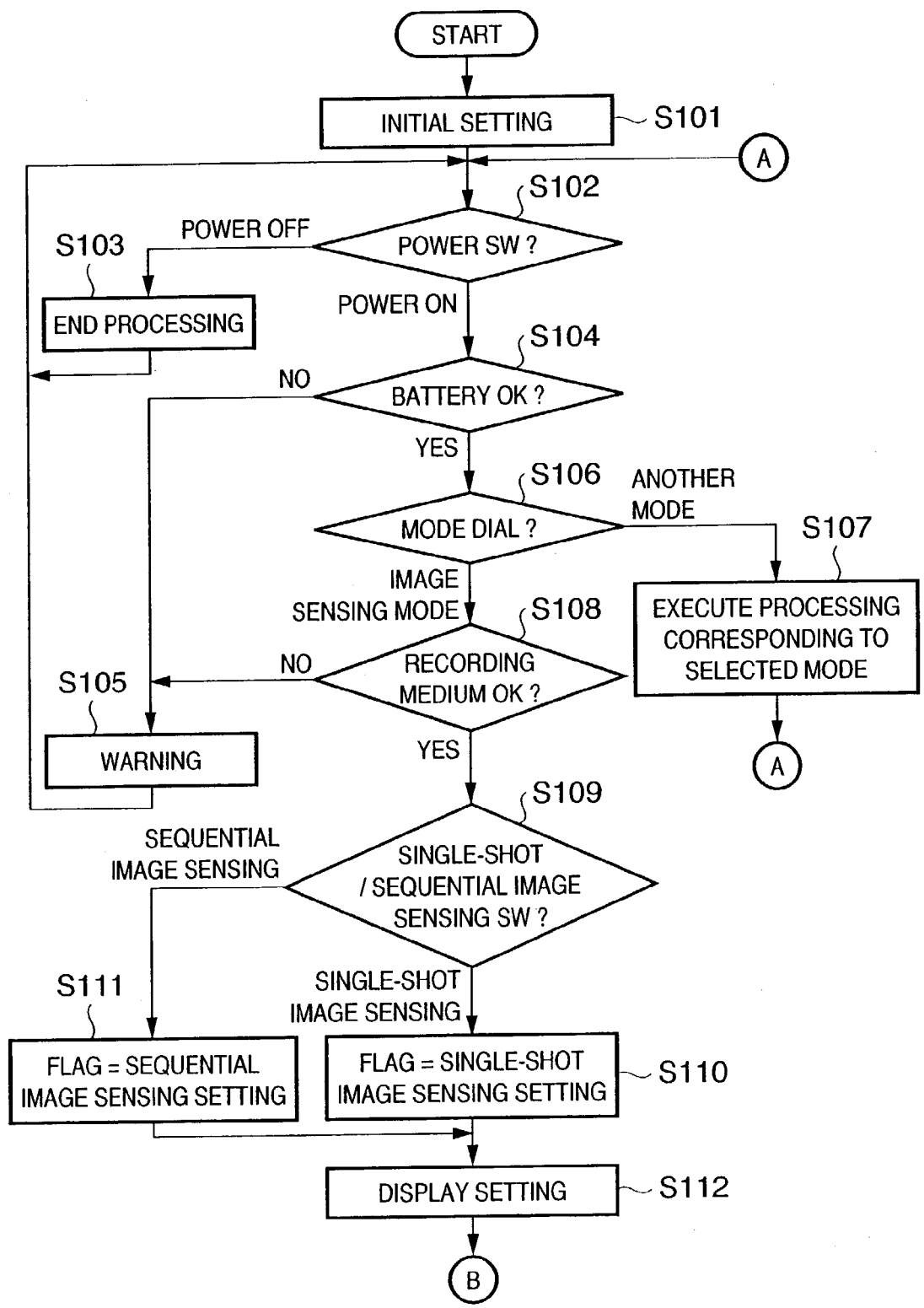
FIG. 2 is a flow chart showing the main routine in the image processing apparatus according to the embodiments.
Figure 3:
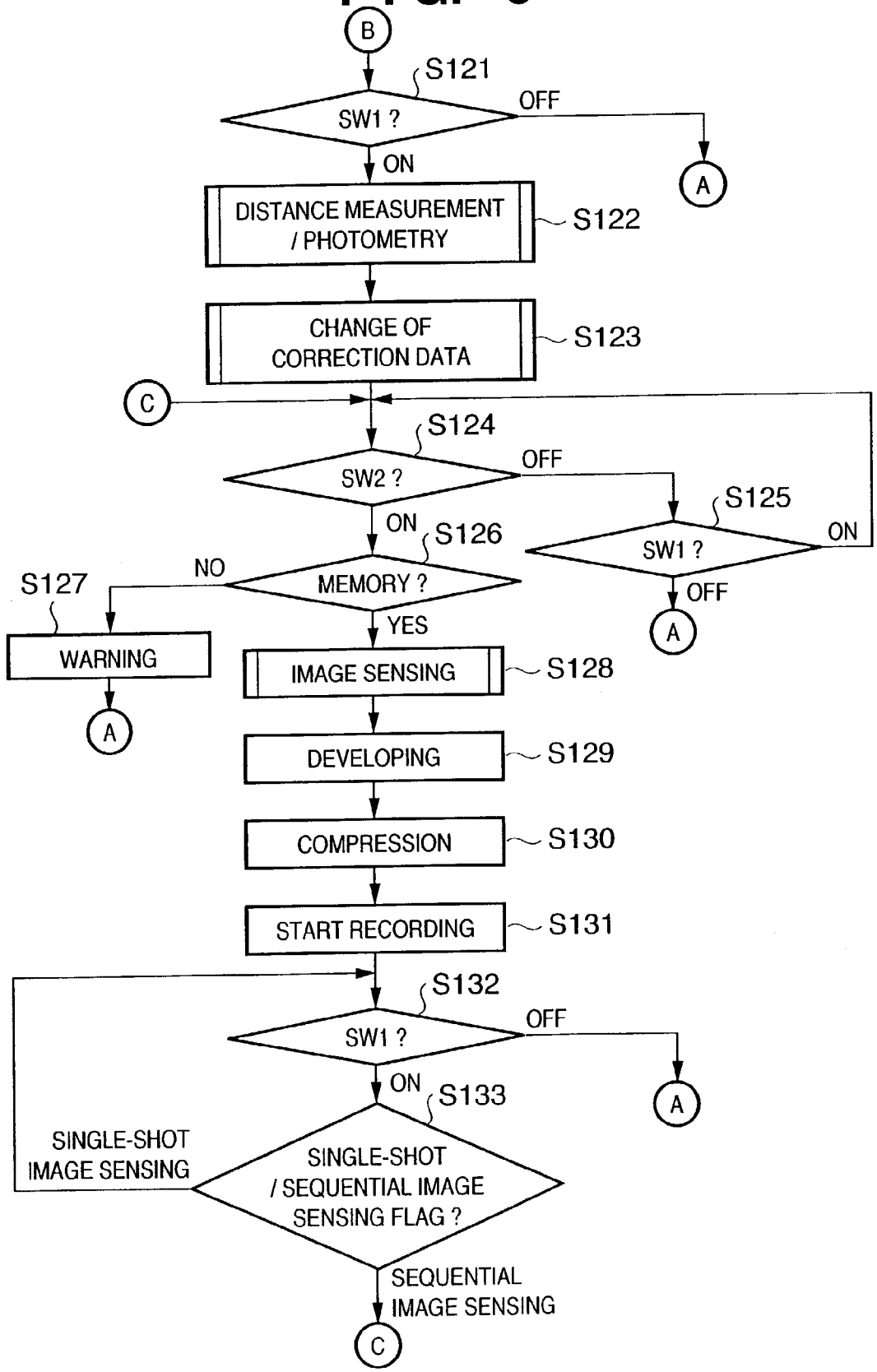
FIG. 3 is a flow chart showing the main routine in the image processing apparatus according to a first embodiment of the present invention.

FIGS. 2 and 3 are flow charts showing the main routine of the image processing apparatus 100 according to the first embodiment. The operation of the image processing apparatus 100 will be described with reference to FIGS. 2 and 3. If the image processing apparatus 100 is powered ON by, e.g., replacing batteries, the system controller 50 initializes flags such as a single-shot/sequential image sensing flag and flash flag (to be described later), control variables, and the like, and performs predetermined initial settings necessary for the respective parts of the image processing apparatus 100 (step S101). The system controller 50 checks the set position of the power switch 72 (step S102).

If the power switch 72 is set to power-OFF ("power OFF" in step S102), the system controller 50 performs predetermined end processing such that the display of each notification unit is changed to an end state, necessary parameters including flags and control variables, set values, and set modes are stored in the nonvolatile memory 56, and unnecessary power supplies of the respective parts of the image processing apparatus 100 including the image display unit 28 are turned OFF by the power controller 80 (step S103). After that, the process returns to step S102. If the power switch 72 is set to power-ON ("power ON" in step S102), the system controller 50 causes the power controller 80 to check whether the remaining capacity or operation status of the power source 86 formed from a battery or the like inhibits the operation of the image processing apparatus 100 (step S104).

If the power source 86 has any problem (NO in step S104), the system controller 50 generates a predetermined warning display output or warning sound output by an image or sound using the notification unit 54 (step S105), and the process returns to step S102. If the power source 86 has no problem (YES in step S104), the system controller 50 checks the set position of the mode dial switch 60 (step S106). If the mode dial switch 60 is set to an image sensing mode ("image sensing mode" in step S106), the process advances to step S108. If the mode dial switch 60 is set to another mode ("another mode" in step S106), the system controller 50 executes processing corresponding to the selected mode (step S107), and after ending the processing, the process returns to step S102.

If the mode dial switch 60 is set to the image sensing mode, the system controller 50 checks whether the recording medium 200 or 210 is mounted in the image processing apparatus 100, acquires management information of image data recorded on the recording medium 200 or 210, and checks whether the operation state of the recording medium 200 or 210 inhibits the operation of the image processing apparatus 100, particularly image data recording/reproduction operation with respect to the recording medium (step S108). If the recording medium 200 or 210 has any problem as a result of determination (NO in step S108), the system controller 50 generates a predetermined warning display output or warning sound output by an image or sound using the notification unit 54 (step S105), and the process returns to step S102. If the recording medium 200 or 210 has no problem as a result of determination (YES in step S108), the system controller 50 advances to step S109.

The system controller 50 checks the set state of the single-shot/sequential image sensing switch 68 which sets single-shot/sequential image sensing (step S109). If single-shot image sensing has been selected, the system controller 50 sets the single-shot/sequential image sensing flag to single-shot image sensing (step S110), and if sequential image sensing has been selected, to sequential image sensing (step S111). After the flag is set, the process shifts to step S112. The single-shot image sensing mode in which an image of one frame is sensed and then the device stands by when the shutter switch SW2 64 is pressed, and the sequential image sensing mode in which images are sequentially sensed while the shutter switch SW2 64 is kept pressed can be arbitrarily switched and set by operating the single-shot/sequential image sensing switch 68. Note that the state of the single-shot/sequential image sensing flag is stored in the internal memory of the system controller 50 or the memory 52.

The system controller 50 generates display outputs and sound outputs for various set states of the image processing apparatus 100 by images and sound using the notification unit 54 (step S112). If the image display of the image display unit 28 is ON, the system controller 50 also uses the image display unit 28 to generate display outputs and sound outputs for various set states of the image processing apparatus 100 by images and sound.

The system controller 50 confirms the state of the shutter switch SW1 62 (step S121), and if the shutter switch SW1 62 is not pressed ("OFF" in step S121), the process returns to step S102. If the shutter switch SW1 62 is pressed ("ON" in step S121), the system controller 50 performs distance measurement/photometry processing of focusing the image sensing lens 310 on an object to be sensed by distance measurement processing, and determining an f-number and shutter time by photometry processing (step S122). Thereafter, the process shifts to step S123. In photometry processing, the flash is also set, as needed. Details of distance measurement/photometry processing will be explained later with reference to FIG. 4.

The system controller 50 reads out from the nonvolatile memory 56 one-dimensional correction data used for horizontal dark shading correction, and maps the data in the memory 30. At the end of mapping the one-dimensional correction data, the system controller 50 captures a dark image in the use of the one-dimensional correction data (meaning an accumulated charge output from the image sensing device 14 while keeping the shutter 12 closed). The system controller 50 changes the mapped correction data in accordance with the state of the dark image (step S123). Details of step S123 will be described later with reference to FIG. 6.

The system controller 50 confirms the state of the shutter switch SW2 64 (step S124). If the shutter switch SW2 64 is not pressed ("OFF" in step S124), the process shifts to step S125, and if the shutter switch SW1 62 is not pressed, too, immediately returns to step S102. If the shutter switch SW1 62 is pressed, the process returns to step S124. If the shutter switch SW2 64 is pressed ("ON" in step S124), the system controller 50 checks whether the memory 30 has an image storage buffer area capable of storing image data sensed in the second image sensing mode (step S126).

If the image storage buffer area of the memory 30 does not have any area capable of storing new image data (NO in step S126), the system controller 50 generates a predetermined warning display output or warning sound output by an image or sound using the notification unit 54 (step S127), and the process returns to step S102. This situation occurs when, for example, the first image which should be read out from the memory 30 and written into the recording medium 200 or 210 has not been recorded yet on the recording medium 200 or 210, and no free area even for one image can be ensured in the image storage buffer area of the memory 30 immediately after sequential image sensing by the maximum number of images which can be stored in the image storage buffer area of the memory 30.

To store sensed image data in the image storage buffer area of the memory 30 after compression, whether the storage area can be ensured in the image storage buffer area of the memory 30 is checked in step S126 in consideration of the fact that the compressed image data amount changes depending on the settings of the compression mode.

If the memory 30 has an image storage buffer area capable of storing sensed image data (YES in step S126), the system controller 50 executes image sensing processing of reading from the image sensing device 14 a sensed image signal accumulated for a predetermined time, and writing the sensed image data into a predetermined area of the memory 30 via the A/D converter 16, image processor 20, and memory controller 22, or via the memory controller 22 directly from the A/D converter 16 (step S128). Details of image sensing processing step S128 will be described later with reference to FIG. 5.

The system controller 50 reads out via the memory controller 22 part of image data written in the predetermined area of the memory 30, performs WB (White Balance) integral calculation processing and OB (Optical Black) integral calculation processing necessary for developing processing, and stores the results of calculations in the internal memory of the system controller 50 or the memory 52. The system controller 50 reads out the sensed image data written in the predetermined area of the memory 30 by using the memory controller 22, and if necessary, the image processor 20. Also, the system controller 50 executes various developing processes including AWB (Auto White Balance) processing, gamma conversion processing, and color conversion processing by using the results of calculations stored in the internal memory of the system controller 50 or the memory 52 (step S129).

In developing processing, the system controller 50 also executes dark correction calculation processing of canceling the dark current noise of the image sensing device 14 or the like by subtraction processing using the correction data which has been mapped and changed in step S123 in accordance with the state of the dark image data. By dark correction calculation processing using horizontal dark shading correction data, sensed image data can be corrected for image quality degradation caused by horizontal dark current noise or fixed pattern noise in the image sensing device 14, without performing dark image capturing processing for a sensed image in the entire image sensing region.

The system controller 50 reads out the image data written in the predetermined area of the memory 30, and performs image compression processing corresponding to the set mode by the compression/expansion circuit 32 (step S130). The system controller 50 writes the image data having undergone a series of processes into a free portion of the image storage buffer area of the memory 30. Along with execution of a series of image sensing processes, the system controller 50 reads out the image data stored in the image storage buffer area of the memory 30, and writes the data into the recording medium 200 or 210 such as a memory card or compact flash® card via the interface 90 or 94 and the connector 92 or 96 (step S131).

Recording processing is executed every time image data having undergone a series of processes is newly written into a free portion of the image storage buffer area of the memory 30. During write of image data into the recording medium 200 or 210, an LED, for instance, of the notification unit 54 is flickered in order to explicitly indicate that write operation is in progress.

The system controller 50 checks whether the shutter switch SW1 62 is pressed (step S132), and if the shutter switch SW1 62 is not pressed, the process returns to step S102. If the shutter switch SW1 62 is pressed, the system controller 50 checks the state of the single-shot/sequential image sensing flag stored in the internal memory of the system controller 50 or the memory 52 (step S133). If single-shot image sensing has been set, the process returns to step S132 and waits until the shutter switch SW1 62 is turned off. If sequential image sensing has been set, the process returns to step S124 and prepares for image sensing of the next frame. A series of image sensing processes then end.

<Distance Measurement/Photometry Processing>

Figure 4:
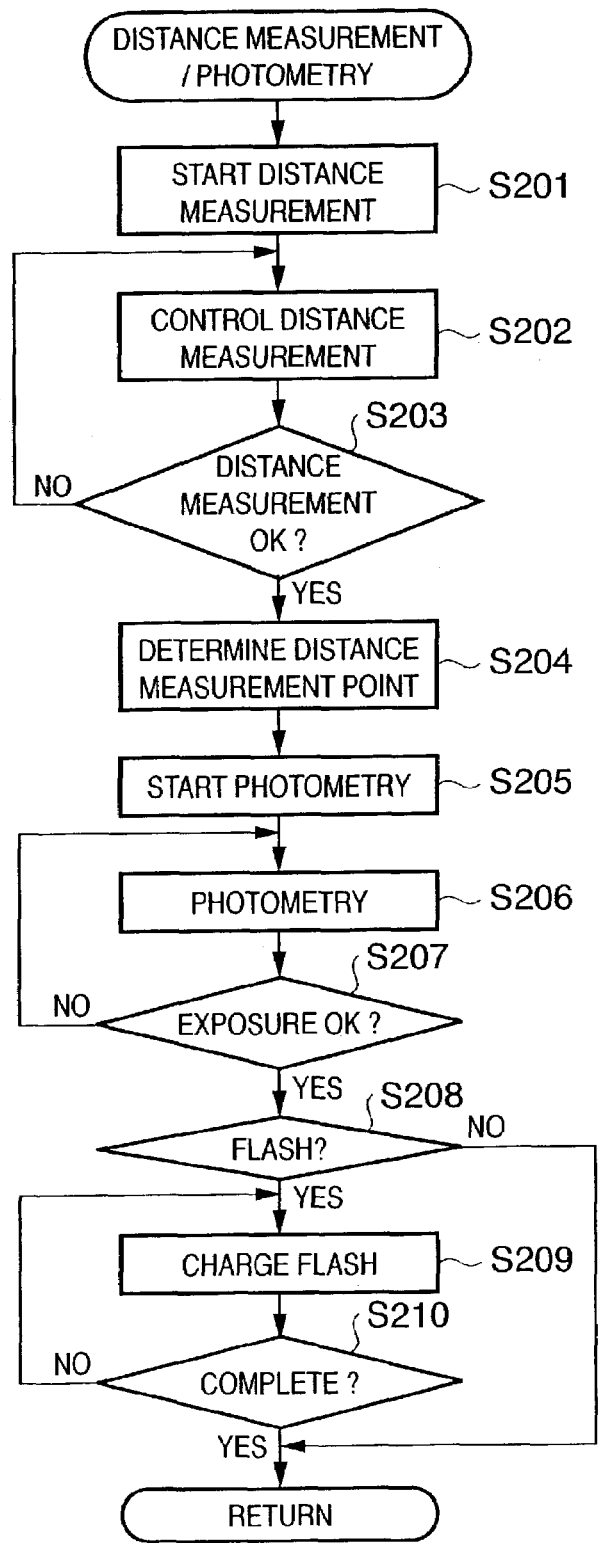
FIG. 4 is a flow chart showing a distance measurement/photometry processing routine in the image processing apparatus according to the embodiments.

FIG. 4 is a flow chart showing details of distance measurement/photometry processing in step S122 of FIG. 3. In distance measurement/photometry processing, various signals are exchanged between the system controller 50 of the image processing apparatus 100 and the stop controller 340 or distance measurement controller 342 of the lens unit 300 via the interface 120, connector 122, connector 322, interface 320, and lens controller 350. The system controller 50 starts AF processing by using the image sensing device 14, the distance measurement unit 42, and the distance measurement controller 342 of the lens unit 300 (step S201).

The system controller 50 executes AF control (step S202). More specifically,light incident on the lens 310 of the lens unit 300 is guided to enter the distance measurement unit 42 via the stop 312, the lens mount 306, and the lens mount 106, mirror 130, and distance measurement sub-mirror (not shown) of the image processing apparatus 100, thereby checking the focus state of an image formed as an optical image. While the lens 310 is driven by using the distance measurement controller 342 of the lens unit 300 until the image is determined to be in focus by distance measurement (AF) (YES in step S203), the focus state is detected by using the distance measurement unit 42 of the image processing apparatus 100 (step S202). If the image is determined to be in focus by distance measurement (AF) (YES in step S203), the system controller 50 determines a distance measurement point where the image is in focus from a plurality of distance measurement points within the image frame (step S204). The system controller 50 stores distance measurement data and set parameters (or either of distance measurement data and set parameters) in the internal memory of the system controller 50 or the memory 52 together with the determined distance measurement point data, and the process advances to step S205.

The system controller 50 starts AE (Auto Exposure) processing by using the photometry unit 46 (step S205). The system controller 50 causes light incident on the lens 310 of the lens unit 300 to enter the photometry unit 46 via the stop 312, the lens mount 306, and the lens mount 106, mirrors 130 and 132, and photometry lens (not shown) of the image processing apparatus 100, thereby measuring the exposure state of an image formed as an optical image. The system controller 50 performs photometry processing by using the shutter controller 40 until exposure is determined to be proper (YES in step S207) (step S206). If exposure is determined to be proper (YES in step S207), the system controller 50 stores photometry data and set parameters (or either of photometry data and set parameters) in the internal memory of the system controller 50 or the memory 52, and advances to step S208.

The system controller 50 determines an f-number (Av value) and shutter speed (Tv value) in accordance with the exposure (AE) result detected in photometry processing step S206 and an image sensing mode set by the mode dial switch 60. The system controller 50 determines the charge accumulation time of the image sensing device 14 in accordance with the determined shutter speed (Tv value), and performs image sensing processing and dark capturing processing for the same charge accumulation time.

The system controller 50 determines from measurement data obtained in photometry processing step S206 whether the flash is required (step S208). If the flash is not required, the system controller 50 clears the flash flag, and ends distance measurement/photometry processing routine step S122 (FIG. 3). If the flash is required, the flash flag is set, and the flash 48 is charged (step S209) until the flash 48 is fully charged (step S210). If the flash 48 has been charged (YES in step S210), the system controller 50 ends the distance measurement/photometry processing routine (step S122 of FIG. 3).

<Image Sensing Processing>

Figure 5:
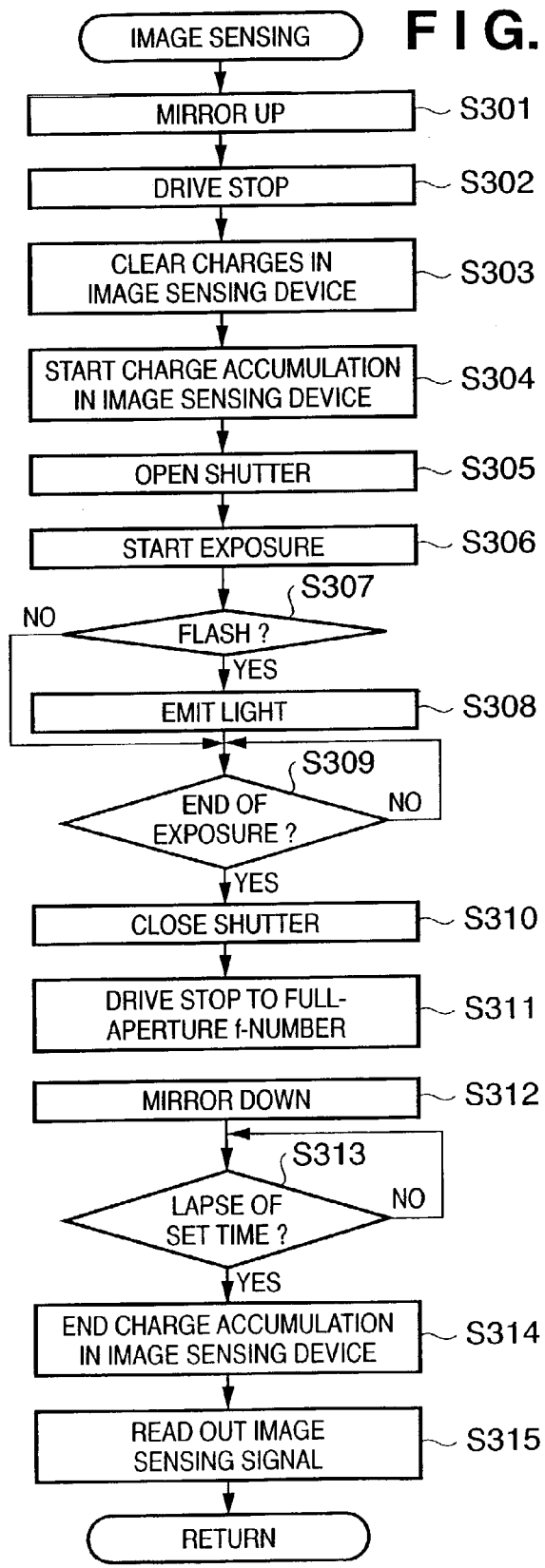
FIG. 5 is a flow chart showing an image sensing processing routine in the image processing apparatus according to the embodiments.

FIG. 5 is a flow chart showing details of image sensing processing in step S128 of FIG. 3. In image sensing processing, various signals are exchanged between the system controller 50 of the image processing apparatus 100 and the stop controller 340 or distance measurement controller 342 of the lens unit 300 via the interface 120, connector 122, connector 322, interface 320, and lens controller 350. The system controller 50 moves the mirror 130 to a predetermined position (mirror-up position) outside the optical axis by a mirror driving unit (not shown) (step S301). The system controller 50 drives the stop 312 to a predetermined f-number by the stop controller 340 in accordance with photometry data stored in the internal memory of the system controller 50 or the memory 52 (step S302).

The system controller 50 executes charge clear operation for the image sensing device 14 (step S303). After charge accumulation in the image sensing device 14 starts (step S304), the system controller 50 opens the shutter 12 by the shutter controller 40 (step S305), and starts exposure of the image sensing device 14 (step S306). The system controller 50 determines from the flash flag whether the flash 48 is required (step S307), and if the flash 48 is required, causes the flash 48 to emit light (step S308). The system controller 50 waits for the end of exposure of the image sensing device 14 in accordance with photometry data (step S309), closes the shutter 12 by the shutter controller 40 (step S310), and ends exposure of the image sensing device 14.

The system controller 50 drives the stop 312 to a full-aperture f-number by the stop controller 340 of the lens unit 300 (step S311), and moves the mirror 130 to a predetermined position (mirror-down position) within the optical axis by the mirror driving unit (not shown) (step S312). Upon the lapse of a set charge accumulation time (YES in step S313), the system controller 50 ends charge accumulation in the image sensing device 14 (step S314). The system controller 50 reads a charge signal from the image sensing device 14, and writes sensed image data into a predetermined area of the memory 30 via the A/D converter 16, image processor 20, and memory controller 22, or via the memory controller 22 directly from the A/D converter 16 (step S315). After a series of processes end, the system controller 50 ends the image sensing processing routine (step S128 of FIG. 3).

<Correction Data Change Processing>

Figure 6:
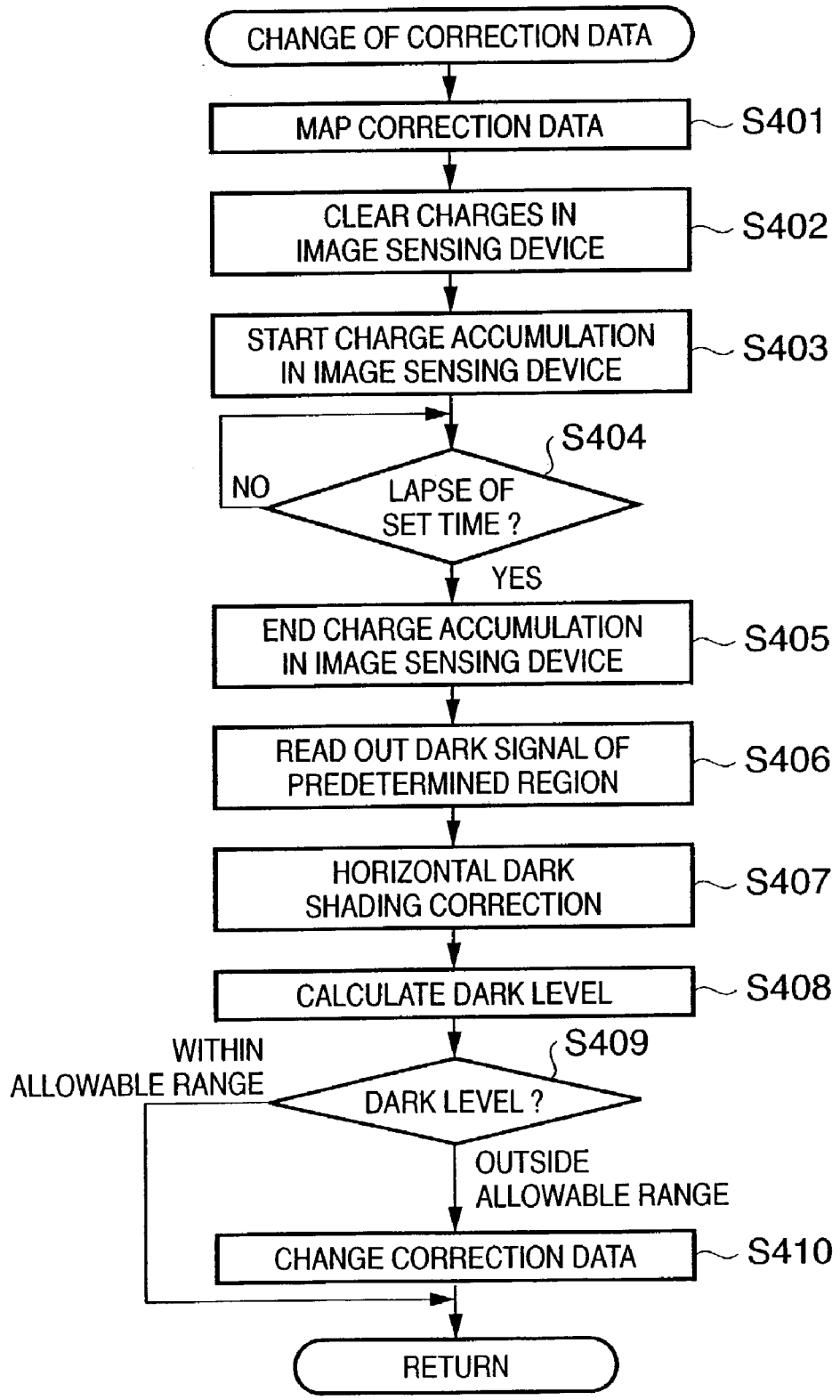
FIG. 6 is a flow chart showing a correction data change processing routine in the image processing apparatus according to the first embodiment of the present invention.

FIG. 6 is a flow chart showing details of correction data change processing in step S123 of FIG. 3. The system controller 50 of the image processing apparatus 100 reads out from the nonvolatile memory 56 one-dimensional correction data (to be referred to as "correction data" hereinafter) used for horizontal dark shading correction, and maps the data in the memory 30 (step S401). The system controller 50 executes charge clear operation for the image sensing device 14 (step S402), and starts charge accumulation in the image sensing device 14 in the first image sensing mode while keeping the shutter 12 closed (step S403).

Upon the lapse of a set charge accumulation time (YES in step S404), the system controller 50 ends charge accumulation in the image sensing device 14 (step S405). The system controller 50 reads out a charge signal from the image sensing device 14, and writes only image data of a predetermined region (e.g., several lines) as part of the image sensing device 14 into a predetermined area of the memory 30 via the A/D converter 16, image processor 20, and memory controller 22, or via the memory controller 22 directly from the A/D converter 16 (step S406). The system controller 50 performs horizontal dark shading correction processing for the image data written in the memory 30 by using the correction data read out from the nonvolatile memory 56 (step S407).

The system controller 50 calculates a dark level from the image data having undergone horizontal dark shading correction processing (step S408). As a calculation method, e.g., the average value of image data having undergone horizontal dark shading correction processing is calculated and used. If the dark level calculated in step S408 is not an allowable value ("outside allowable range" in step S409), the dark level varies under the influence of the ambient temperature on the output circuit (not shown) of the image sensing device 14. Thus, the system controller 50 changes the correction data so as to make the calculated dark level reach an allowable value (step S410), and ends the correction data change processing routine. Note that the change of correction data means the change of mainly the offset amount of correction data. Depending on the correction method, only the correction coefficient or both the offset amount and correction coefficient of correction data may be changed. The correction data is such data as to cancel a dark current component of the image sensing device 14 and the FPN (Fixed Pattern Noise) of the circuit system.

If the dark level calculated in step S408 is an allowable value ("within allowable range" in step S409), the dark level falls within a proper range without any influence of the ambient temperature on the image sensing device 14. The system controller 50 therefore ends the correction data change processing routine without changing correction data.

As described above, according to the first embodiment, image data which is obtained in the first image sensing mode and referred to in order to change correction data is data read from not the entire region but a predetermined region of the image sensing device 14, and this image data read time is very short. Even if the characteristic of the image sensing system changes under the influence of the ambient temperature, an increase in the release time lag along with dark image sensing can be prevented, compared to a case wherein correction data is not changed.

Correction data is changed in accordance with image data obtained in the first image sensing mode every image sensing, and image data obtained in the second image sensing mode is corrected using the changed correction data. Even if the dark current noise of the image sensing device 14 nonlinearly changes depending on the temperature characteristic of the output circuit, the noise component can be easily canceled, preventing image quality degradation and obtaining a high-quality image.

In the first embodiment, correction data for horizontal dark shading correction is mapped (step S401 of FIG. 6) after the shutter switch SW1 62 is pressed. Alternatively, correction data may be mapped after power-ON of the image processing apparatus.

In the first embodiment, correction data is one-dimensional horizontal data, but may be one-dimensional vertical data or two-dimensional data.

In the first embodiment, correction data is changed (step S123 of FIG. 3) after the shutter switch SW1 62 is pressed. Alternatively, correction data may be changed immediately before image sensing (immediately before step S129 of FIG. 3) after the shutter switch SW2 64 is pressed.

In the first embodiment, processing of changing correction data (step S123 of FIG. 3) is performed regardless of the ambient temperature. Processing of correction data may be performed only when the ambient temperature falls outside a predetermined range. The predetermined range is an ambient temperature range where the output of the image sensing device 14 is free from any influence and horizontal dark shading correction data need not be changed.

<Second Embodiment>

The second embodiment of the present invention realizes effective shading correction even when the shading of an image sensing device changes depending on image sensing conditions (image sensing ISO (International Organization for Standardization) sensitivity) in an image processing apparatus such as an electronic camera. The second embodiment of the present invention will be described in detail below with reference to the accompanying drawings.

The arrangement of an image processing apparatus in the second embodiment is the same as that in the first embodiment shown in FIG. 1, and a description thereof will be omitted.

In the second embodiment, a nonvolatile memory 56 stores various parameters, set values such as the image sensing ISO sensitivity, set modes, one-dimensional shading correction data at a reference image sensing ISO sensitivity that is used for horizontal dark shading correction, and a gain amount and offset amount corresponding to each image sensing ISO sensitivity. One-dimensional shading correction data is created and written in adjustment during the manufacturing process of the image processing apparatus. Alternatively, one-dimensional shading correction data may be generated baed on a dark image captured right after the image processing apparatus is powered ON.

Figure 7:
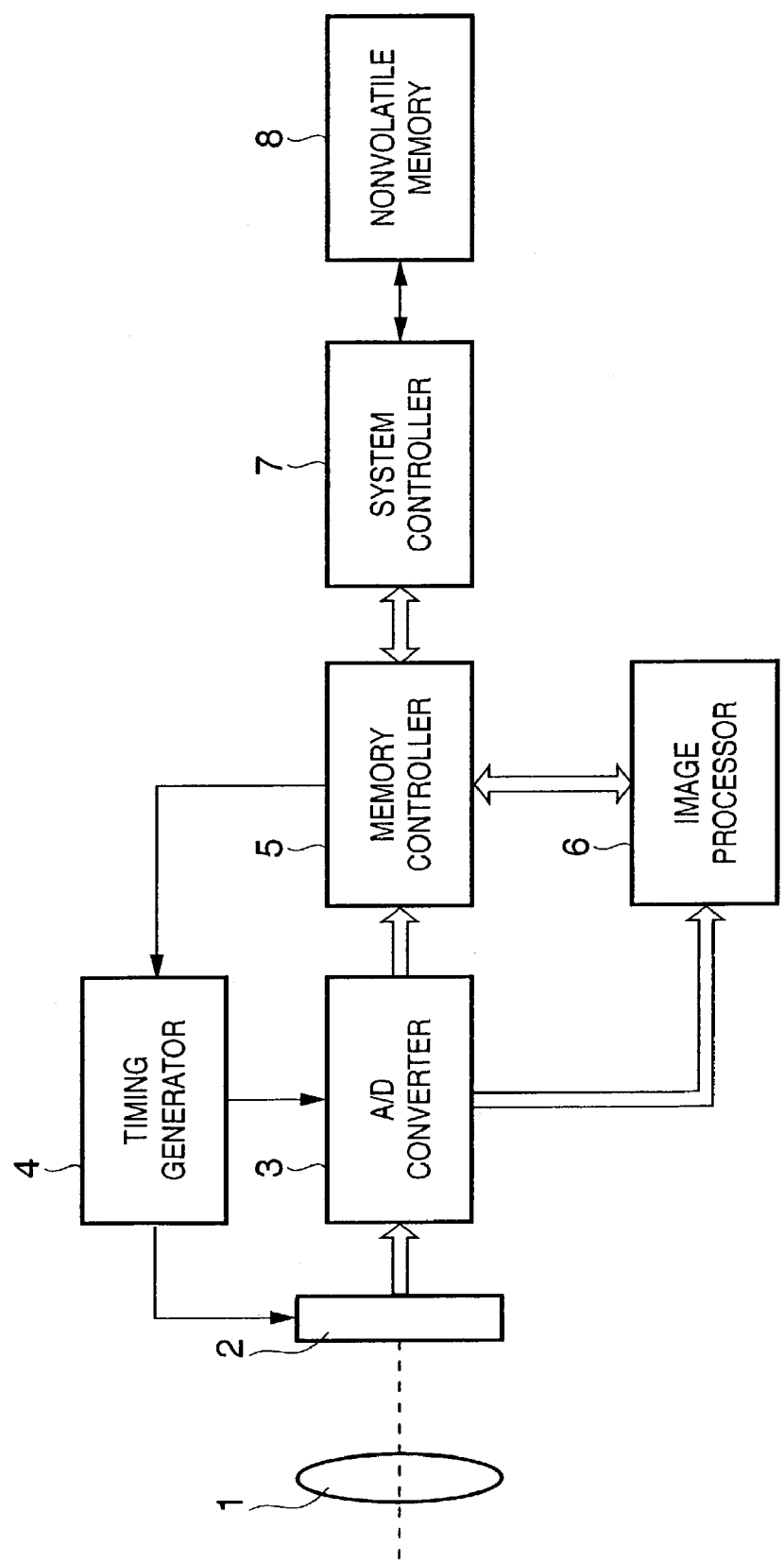
FIG. 7 is a block diagram showing the arrangement of the main part of an image processing apparatus according to a second embodiment of the present invention.

FIG. 7 is a block diagram showing the arrangement of the main part of the image processing apparatus according to the second embodiment. The image processing apparatus comprises an image sensing lens 1 (310 in FIG. 1), a solid-state image sensing device 2 (14 in FIG. 1), an A/D converter 3 (16 in FIG. 1), a timing generator 4 (18 in FIG. 1), a memory controller 5 (22 in FIG. 1), an image processor 6 (20 in FIG. 1), a system controller 7 (50 in FIG. 1), and a nonvolatile memory 8 (56 in FIG. 1).

The image sensing lens 1 forms an optical image of an object to be sensed onto the solid-state image sensing device 2. The solid-state image sensing device 2 converts the formed image data into an electrical signal. The A/D converter 3 A/D-converts an output signal from the solid-state image sensing device 2. The timing generator 4 determines the operation timings of the solid-state image sensing device 2 and A/D converter 3. The memory controller 5 controls the A/D converter 3, timing generator 4, image processor 6, and nonvolatile memory 8. The image processor 6 performs predetermined pixel interpolation processing and color conversion processing on data from the A/D converter 3 or data from the memory controller 5. The system controller 7 controls the overall image processing apparatus. The nonvolatile memory 8 is an electrically erasable and recordable memory, and stores various parameters, set values such as the ISO sensitivity, set modes, one-dimensional shading correction data at a reference image sensing ISO sensitivity that is used for horizontal dark shading correction, and a gain amount and offset amount corresponding to each image sensing ISO sensitivity.

The operation of the image processing apparatus with the above arrangement according to the second embodiment will be described in detail below.

<Whole Processing of Image Processing Apparatus 100>

The whole processing of an image processing apparatus 100 in the second embodiment will be explained. A description of processing from steps S101 to S112 in FIG. 2 which is the same as that in the first embodiment will be omitted. Processing after step S112 will be described with reference to FIGS. 8 and 9.

Figure 8:
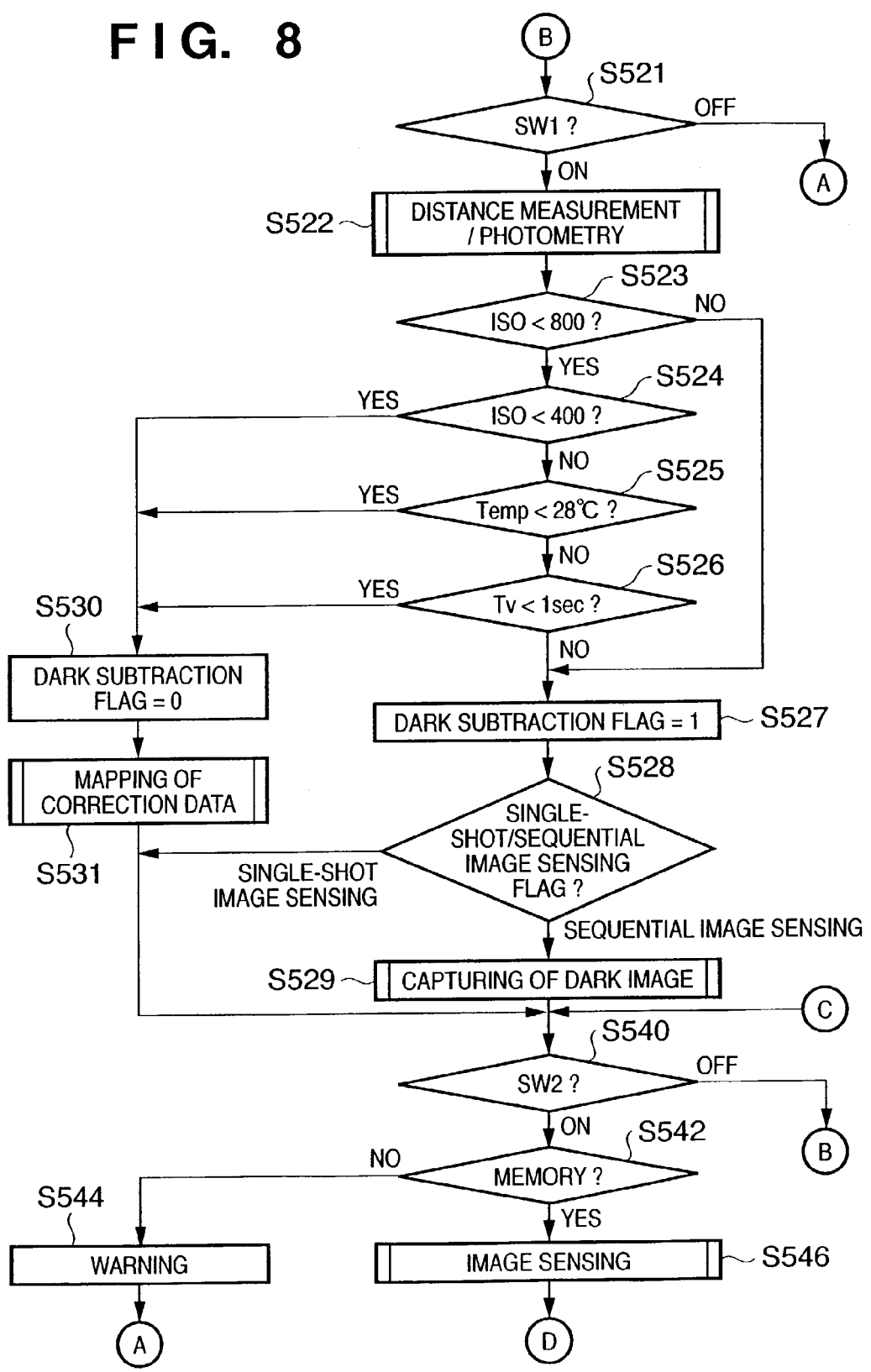
FIG. 8 is a flow chart showing the main routine according to the second embodiment of the present invention.

If a shutter switch SW1 62 is not pressed in step S521 of FIG. 8 ("OFF" in step S521), the flow returns to step S102 in FIG. 2. If the shutter switch SW1 62 is pressed ("ON" in step S521), a system controller 50 performs distance measurement/photometry processing of focusing the image sensing lens 1 on an object to be sensed by distance measurement processing, and determining an f-number and shutter time by photometry processing (step S522). The process then shifts to step S523. In photometry processing, the flash is also set, as needed. Details of distance measurement/photometry processing step S522 is the same as the processes described with reference to FIG. 4 in the above first embodiment, thus the detailed explanation of step S522 is omitted.

The system controller 50 checks the set sensitivity of the image processing apparatus 100 (step S523). If the set sensitivity is lower than ISO 800, the process advances to step S524; if the set sensitivity is equal to or higher than ISO 800, to step S527. This is because the exposure amount is small, and image quality degradation by dark current noise generated by an image sensing device 14, a defective pixel due to a slight scratch unique to the image sensing device 14, or the like becomes conspicuous. In this case, the threshold to determine the set sensitivity is ISO 800, but may be ISO 1600 for a small sensor dark current. The system controller 50 checks whether the set sensitivity is lower than ISO 400 (step S524). If the set sensitivity is lower than ISO 400, the process shifts to step S530; if the set sensitivity is equal to or higher than ISO 400, to step S525.

The system controller 50 checks whether a temperature Temp in the image sensing environment that is detected by a thermometer 44 is lower than 28° C. (step S525). If the temperature Temp is lower than 28° C., the process shifts to step S530; if the temperature Temp is equal to or higher than 28° C., to step S526. The system controller 50 checks whether the shutter time Tv determined in distance measurement/photometry processing (step S522) is equal to or longer than 1 sec (step S526). If the shutter time is 1 sec or more, the system controller 50 sets a dark subtraction flag to 1 (step S527), and the process advances to step S528. If the shutter time is shorter than 1 sec, the system controller 50 clears the dark subtraction flag to 0 (step S530), and the process advances to step S531. After the dark subtraction flag is cleared, correction data corresponding to the image sensing ISO sensitivity is mapped (step S531). Details of correction data mapping processing step S531 will be described later with reference to FIG. 11. Note that "dark subtraction" is calculation processing of subtracting dark image data from image data of actual image sensing (see "BACKGROUND OF THE INVENTION").

After the dark subtraction flag is set, the system controller 50 checks a single-shot/sequential image sensing flag stored in the internal memory of the system controller 50 or a memory 52 (step S528). If single-shot image sensing has been set, the system controller 50 shifts to step S540; if sequential image sensing has been set, captures a dark image (step S529) and the process shifts to step S540. (By performing correction calculation processing using dark image data captured by dark image capturing processing, sensed image data can be corrected for image quality degradation caused by dark current noise generated by the image sensing device 14, a defective pixel due to a slight scratch unique to the image sensing device 14, or the like. Details of dark image capturing processing step S529 will be described with reference to FIG. 10.)

If a shutter switch SW2 64 is not pressed ("OFF" in step S540), the process returns to step S521 and repeats processing up to step S540. If the shutter switch SW2 64 is pressed ("ON" in step S540), the system controller 50 checks whether a memory 30 has an image storage buffer area capable of storing sensed image data (step S542). If the image storage buffer area of the memory 30 does not have any area capable of storing new image data (NO in step S542), the system controller 50 generates a predetermined warning display output or warning sound output by an image or sound using a notification unit 54 (step S544), and the process returns to step S102 in FIG. 2.

This situation occurs when, for example, the first image which should be read out from the memory 30 and written into a recording medium 200 or 210 has not been recorded yet on the recording medium 200 or 210, and no free area even for one image can be ensured in the image storage buffer area of the memory 30 immediately after sequential image sensing by the maximum number of images which can be stored in the image storage buffer area of the memory 30.

To store sensed image data in the image storage buffer area of the memory 30 after compression, whether the storage area can be ensured in the image storage buffer area of the memory 30 is checked in step S542 in consideration of the fact that the compressed image data amount changes depending on the settings of the compression mode.

If the memory 30 has an image storage buffer area capable of storing sensed image data (YES in step S542), the system controller 50 executes image sensing processing of reading from the image sensing device 14 an image sensing signal accumulated for a predetermined time, and writing the sensed image data into a predetermined area of the memory 30 via an A/D converter 16, image processor 20, and memory controller 22, or via the memory controller 22 directly from the A/D converter 16 (step S546). In image sensing processing step S546, the processing described with reference to FIG. 5 in the above first embodiment is performed, and thus the detailed description of the step S546 is omitted. After image sensing processing step S546 ends, the system controller 50 checks the state of the dark subtraction flag stored in the internal memory of the system controller 50 or the memory 52 (step S548). If no dark subtraction flag has been set, the process shifts to step S554.

If the dark subtraction flag has been set, the system controller 50 checks the state of the single-shot/sequential image sensing flag stored in the internal memory of the system controller 50 or the memory 52 (step S550). If single-shot image sensing has been set, the process advances to step S552; if sequential image sensing has been set, to step S554. In single-shot image sensing setting, the system controller 50 performs dark capturing processing of accumulating a noise component such as the dark current of the image sensing device 14 for the same time as that of actual image sensing while keeping a shutter 12 closed, and reading the accumulated noise image signal (step S552). After that, the process shifts to step S554. Details of dark capturing processing step S552 will be described with reference to FIG. 10.

The system controller 50 reads out via the memory controller 22 part of image data written in a predetermined area of the memory 30, performs WB (White Balance)

integral calculation processing and OB (Optical Black) integral calculation processing necessary for developing processing, and stores the results of calculations in the internal memory of the system controller 50 or the memory 52. The system controller 50 reads out the sensed image data written in the predetermined area of the memory 30 by using the memory controller 22, and if necessary, the image processor 20. Also, the system controller 50 executes various developing processes including AWB (Auto White Balance) processing, gamma conversion processing, and color conversion processing by using the results of calculations stored in the internal memory of the system controller 50 or the memory 52 (step S554).

In developing processing, the system controller 50 also executes dark correction calculation processing of canceling the dark current noise of the image sensing device 14 or the like by subtraction processing using horizontal dark shading correction data which corresponds to the image sensing ISO sensitivity value and has been mapped in step S531, or dark image data captured in dark image capturing processing (step S529 or S552).

By correction calculation processing using horizontal dark shading correction data, a sensed image can be corrected for image quality degradation caused by horizontal dark current noise or fixed pattern noise in the image sensing device 14, without performing dark image capturing processing (step S529 or S552) for a sensed image. By correction calculation processing using dark image data obtained in dark image capturing processing, sensed image data can be corrected for image quality degradation caused by a two-dimensional factor such as a defective pixel due to a slight scratch unique to the image sensing device 14, in addition to horizontal dark current noise or fixed pattern noise in the image sensing device 14.

The system controller 50 reads out the image data written in the predetermined area of the memory 30, and performs image compression processing corresponding to the set mode by a compression/expansion circuit 32 (step S556). The system controller 50 writes the image data having undergone a series of processes into a free portion of the image storage buffer area of the memory 30. Along with execution of a series of image sensing processes, the system controller 50 reads out the image data stored in the image storage buffer area of the memory 30, and writes the data into the recording medium 200 or 210 such as a memory card or compact flash® card via an interface 90 or 94 and a connector 92 or 96 (step S558).

Recording processing on the recording medium 200 or 210 is executed for image data every time image data having undergone a series of processes is newly written into a free portion of the image storage buffer area of the memory 30. During write of image data into the recording medium 200 or 210, an LED, for instance, of the notification unit 54 flickered to explicitly indicate that write operation is in progress.

The system controller 50 checks whether the shutter switch SW1 62 is pressed (step S560), and if the shutter switch SW1 62 is OFF, the process returns to step S102 in FIG. 2. If the shutter switch SW1 62 is ON, the system controller 50 checks the single-shot/sequential image sensing flag stored in the internal memory of the system controller 50 or the memory 52 (step S562). If single-shot image sensing has been set, the system controller 50 returns to step S560; if sequential image sensing has been set, returns to step S540 and repeats the above-described operation.

<Dark Image Capturing Processing>

Figure 9:
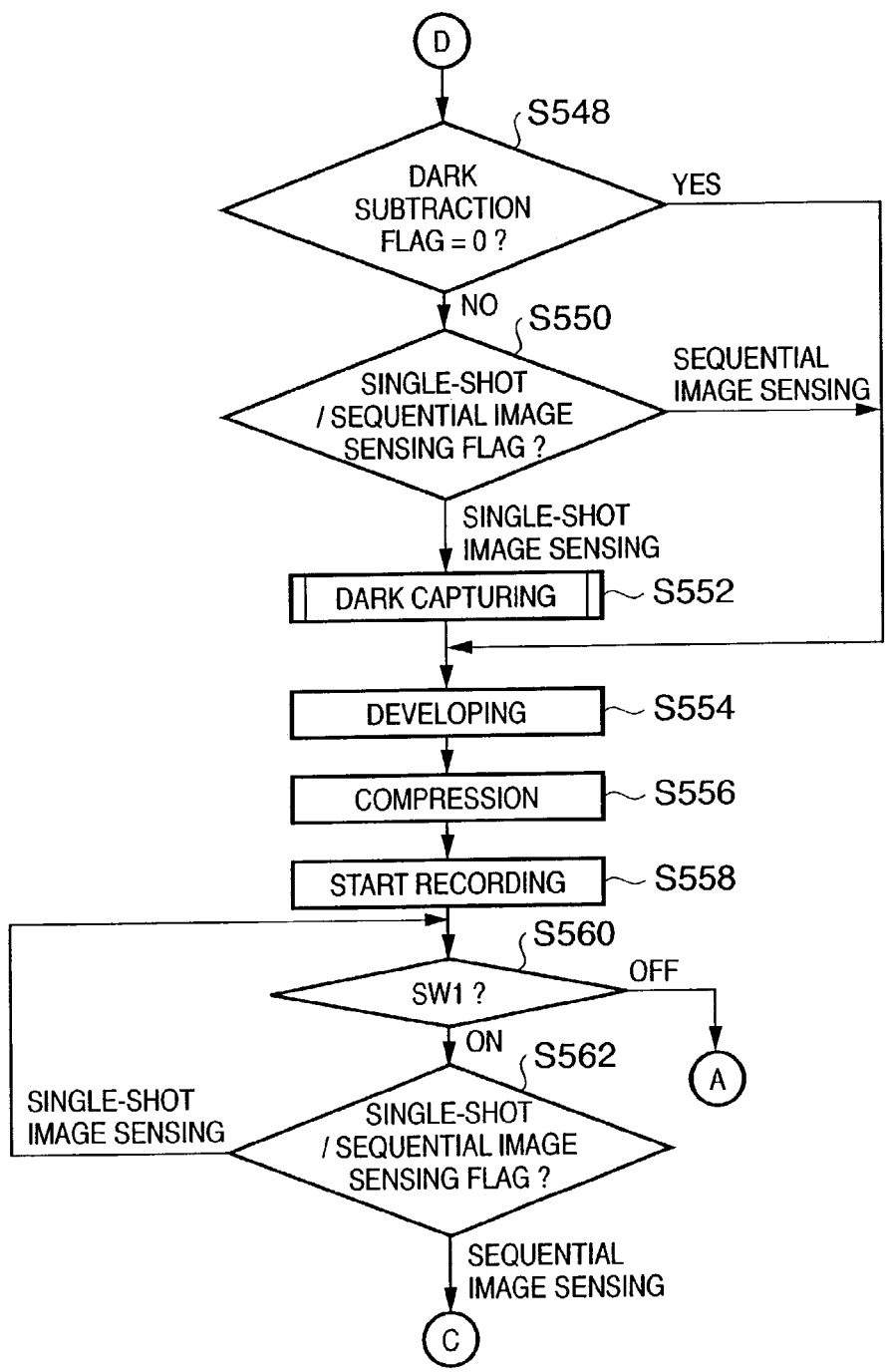
FIG. 9 is a flow chart showing the main routine according to the second embodiment of the present invention.
Figure 10:
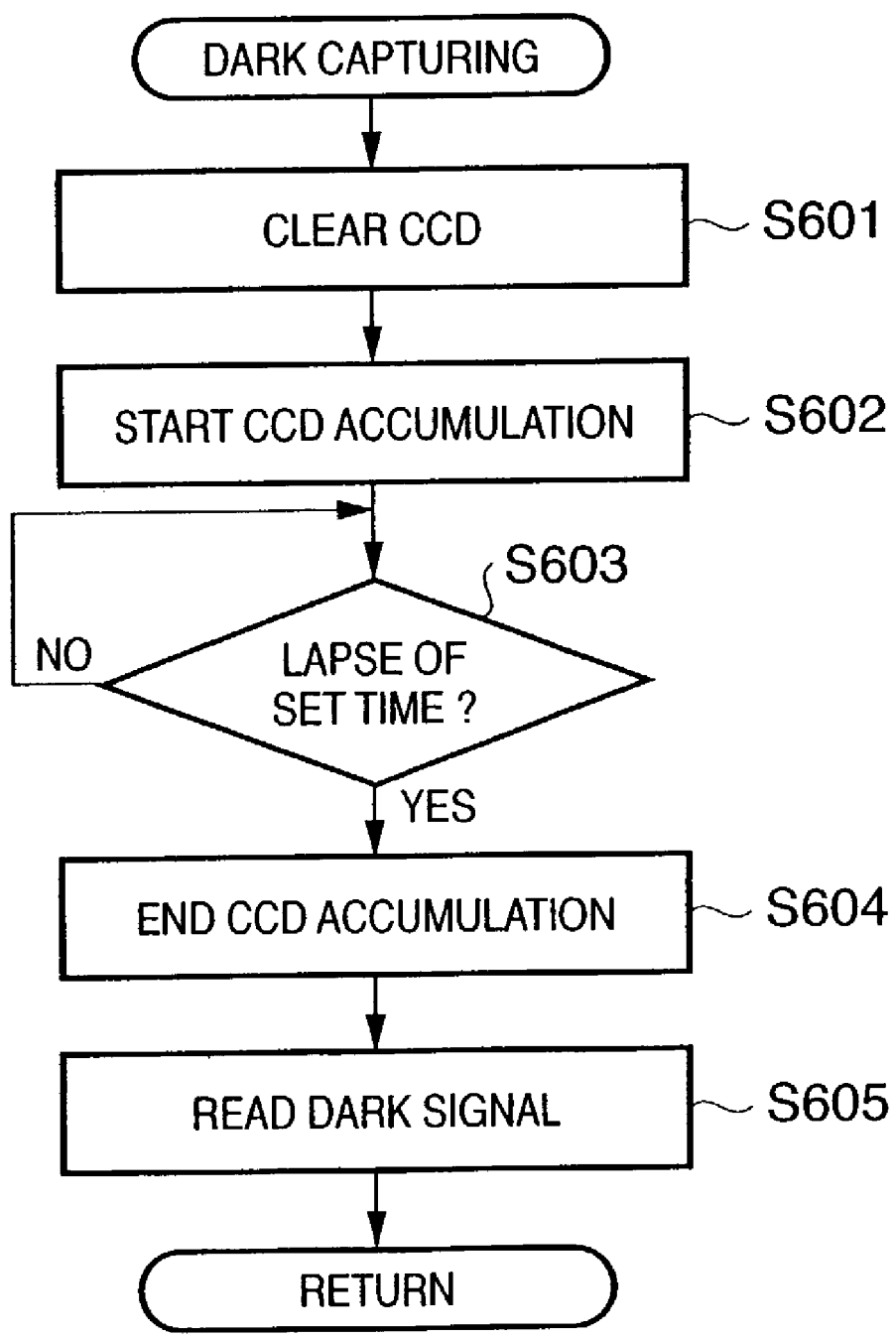
FIG. 10 is a flow chart showing a dark capturing processing routine according to the second embodiment of the present invention.

FIG. 10 is a flow chart showing details of dark image capturing processing in step S529 of FIG. 8 and step S552 of FIG. 9. The system controller 50 of the image processing apparatus 100 executes charge clear operation for the image sensing device (CCD) 14 (step S601), and starts charge accumulation in the image sensing device 14 while keeping the shutter 12 closed (step S602). Upon the lapse of a set charge accumulation time (YES in step S603), the system controller 50 ends charge accumulation in the image sensing device 14 (step S604). The system controller 50 reads a charge signal from the image sensing device 14, and writes image data (dark image data) into a predetermined area of the memory 30 via the A/D converter 16, image processor 20, and memory controller 22, or via the memory controller 22 directly from the A/D converter 16 (step S605).

The dark image data is used in developing processing when image sensing processing is executed before the dark image data is captured and sensed image data is read from the image sensing device 14 and written into the memory 30, and in developing processing when image sensing processing is executed after the dark image data is captured and sensed image data is read from the image sensing device 14 and written into the memory 30. By developing processing using the dark image data, sensed image data can be corrected for image quality degradation caused by dark current noise generated by the image sensing device 14, a defective pixel due to a slight scratch unique to the image sensing device 14, or the like. At the end of a series of processes, dark image capturing processing routine step S529 (FIG. 8) and step S552 (FIG. 9) end.

<Correction Data Mapping Processing>

Figure 11:
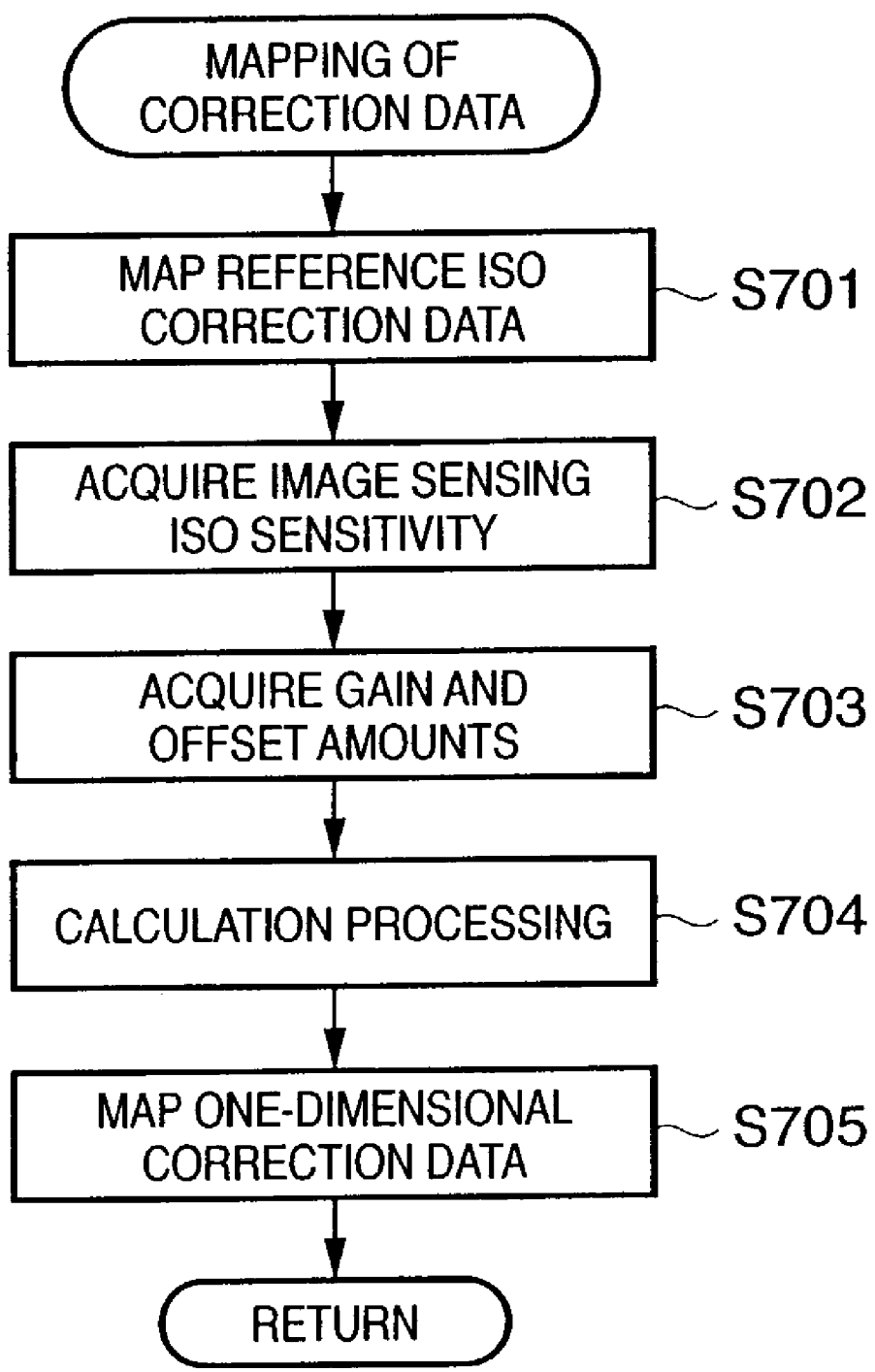
FIG. 11 is a flow chart showing a shading correction data mapping routine according to the second embodiment of the present invention.

FIG. 11 is a flow chart showing details of correction data mapping processing in step S531 of FIG. 8. The system controller 50 of the image processing apparatus 100 reads out from the nonvolatile memory 56 one-dimensional shading correction data which is obtained at a reference image sensing ISO sensitivity value and serves as reference data for one-dimensional shading correction data used for horizontal shading correction. The system controller 50 maps the one-dimensional shading correction data in the memory 30 (step S701). The system controller 50 reads out an image sensing ISO sensitivity value set in the internal memory of the system controller 50 or the memory 52 (step S702). The system controller 50 reads out a gain amount and offset amount corresponding to the readout image sensing ISO sensitivity value from the nonvolatile memory 56, and maps them in the memory 30 (step S703).

The system controller 50 calculates one-dimensional shading correction data, mapped in the memory 30, corresponding to the image sensing ISO sensitivity by arithmetic calculation using the one-dimensional shading correction data at the reference image sensing ISO sensitivity and the gain amount and offset amount corresponding to each image sensing ISO sensitivity (step S704).

Figure 12:
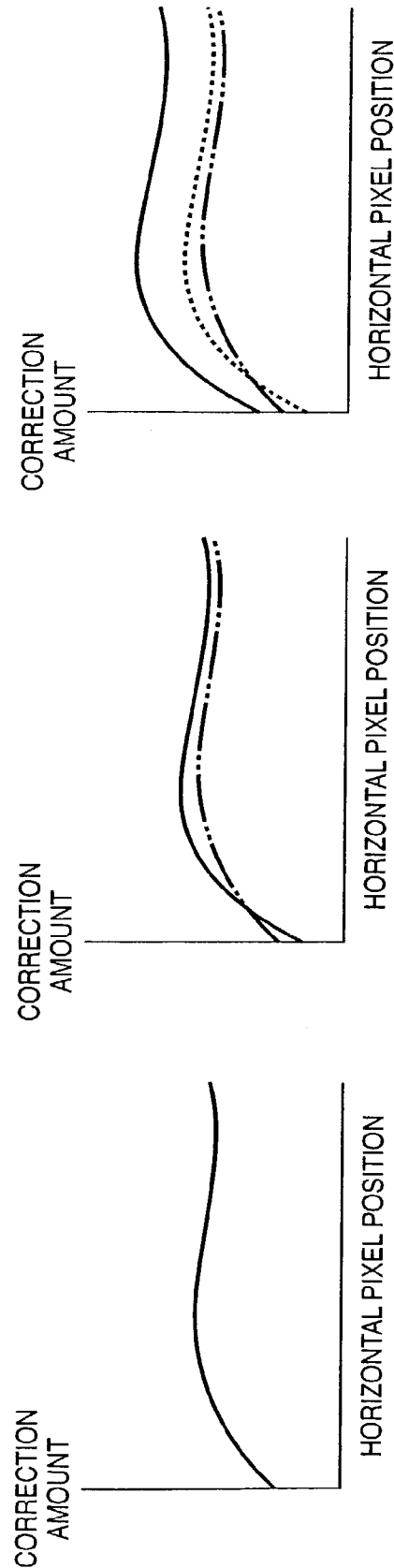

FIGS. 12A to 12C are graphs showing the outline of arithmetic calculation processing in step S704. In FIG. 12A, the solid line represents one-dimensional shading correction data at the reference image sensing ISO sensitivity value that is mapped in the memory 30 in step S701. In FIG. 12B, the chain double-dashed line represents one-dimensional shading correction data at the reference ISO sensitivity. The solid line represents the calculation result of multiplying by the gain amount the one-dimensional shading correction data at the reference ISO sensitivity that is represented by the chain double-dashed line. In FIG. 12C, the chain double-dashed line represents one-dimensional shading correction data at the reference ISO sensitivity. The broken line represents the calculation result of multiplication by the gain. The solid line represents the result of adding/subtracting the offset amount to/from the broken-line calculation result of multiplying by the gain amount the one-dimensional shading correction data at the reference ISO sensitivity. That is, solid-line data is one-dimensional shading correction data corresponding to the image sensing ISO sensitivity.

The system controller 50 maps in the memory 30 the one-dimensional shading correction data which corresponds to the image sensing ISO sensitivity and has been calculated in step S704 (step S705). By developing processing using the shading correction data corresponding to the image sensing ISO sensitivity, sensed image data can be corrected for image quality degradation caused by horizontal dark current noise or fixed pattern noise in the image sensing device 14. At the end of a series of processes, mapping processing routine step S531 (FIG. 8) for one-dimensional shading correction data ends.

<Image Sensing Operation Flow>

Figure 13:
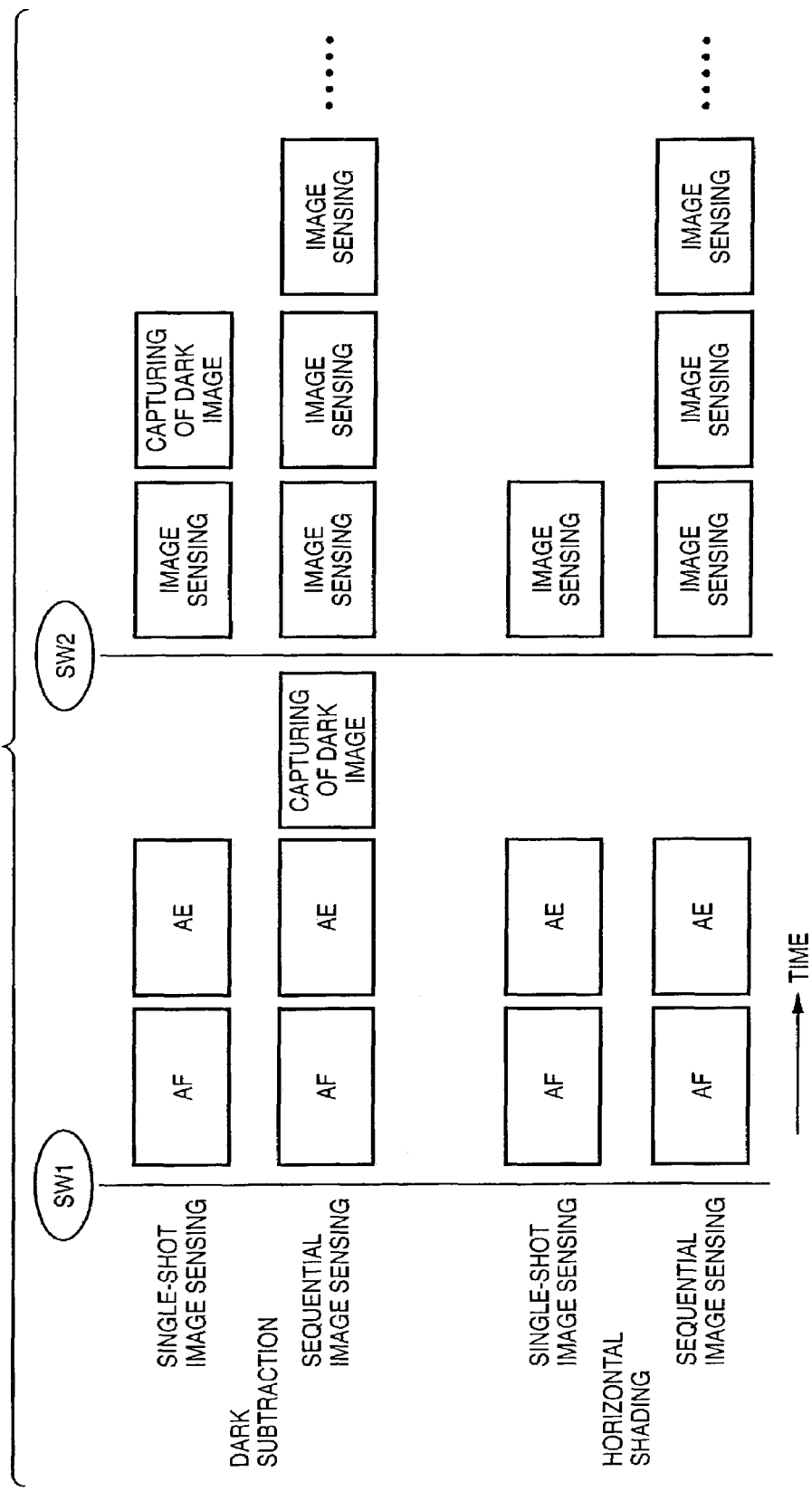
FIG. 13 is an explanatory view showing an image sensing operation flow according to the second embodiment of the present invention.

FIG. 13 is an explanatory view showing an image sensing operation flow according to the second embodiment. AF processing, AE processing, image sensing processing, and dark image capturing processing in FIG. 13 are the same as those described with reference to FIGS. 4 and 5, FIGS. 2, 8 and 9, and FIG. 10, respectively, and a description thereof will be omitted.

As described above, according to the second embodiment of the present invention, shading correction data at a reference image sensing ISO sensitivity, and a gain amount and offset amount at each image sensing ISO sensitivity are stored in the nonvolatile memory 56 in an image processing apparatus which records a sensed still image and/or moving image on a recording medium. Even if the shading changes upon the change in image sensing ISO sensitivity, effective shading correction processing can be done.

It suffices to store, in the nonvolatile memory 56 for each image sensing ISO sensitivity, shading correction data at a reference image sensing ISO sensitivity and a gain amount and offset amount which are much smaller in data amount than the shading correction data. The capacity of the nonvolatile memory 56 can be greatly saved in comparison with a method of storing shading correction data at all image sensing ISO sensitivities in a storage medium.

In the description of the first and second embodiments, single-shot/sequential image sensing is switched using the single-shot/sequential image sensing switch 68. Alternatively, single-shot/sequential image sensing may be switched in accordance with operation mode selection by a mode dial switch 60.

In the description of the above embodiments, the charge accumulation time of actual image sensing processing and that of dark image capturing processing are equal to each other. However, different charge accumulation times may be adopted as far as data enough to correct dark current noise or the like can be obtained. No image sensing operation can be done during execution of dark capturing processing operation in steps S524 and S531 of FIG. 8. A notification unit 54 and/or image display unit 28 may output an image or sound representing that an image processing apparatus 100 is busy.

In the description of the first and second embodiments, image sensing operation is performed by moving the mirror 130 to a mirror-up position or mirror-down position. It is also possible to form a mirror 130 from a half-mirror and perform image sensing operation without moving the mirror 130.

In the description of the first and second embodiments, the recording media 200 and 210 are memory cards such as a PCMCIA card or compact flash®, hard disks, or the like. Recording media 200 and 210 may also be formed from optical disks such as a micro DAT, magneto-optical disk, CD-R, or CD-RW, or phase change optical disks such as a DVD. The recording media 200 and 210 may also be composite media of memory cards and hard disks. Part of the composite medium may be detachable.

In the description of the first and second embodiments, the recording media 200 and 210 are separated from the image processing apparatus 100 and are arbitrarily connectable to it. Either or both of the recording media may be fixed to the image processing apparatus 100. The image processing apparatus 100 may be so constituted as to allow connecting one or an arbitrary number of recording media 200 or 210.

In the description of the first and second embodiments, the recording media 200 and 210 are mounted in the image processing apparatus 100. However, one or a plurality of recording media may be mounted.

The second embodiment does not particularly mention the mapping timing of one-dimensional shading correction data. Correction data may be mapped upon power-ON. Correction data is one-dimensional horizontal data, but may be one-dimensional vertical data or two-dimensional data. Further, only one correction data is stored, but a plurality of correction data may be stored. For a plurality of correction data, a method of selecting only one of a plurality of correction data, or a method of adding a plurality of correction data at an arbitrary ratio may be employed. Correction data is created and written in adjustment during the manufacturing process of the image processing apparatus, but the write stage is not limited to the manufacturing process.

<Other Embodiment>

The present invention can be applied to a system constituted by a plurality of devices or to an apparatus comprising a single device.

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts shown in FIGS. 2-6, or FIGS. 2, 4, 5, 8-11 described in the embodiments.

Further, the above embodiments or the technical elements thereof may be combined as necessary.

The present invention is not limited to the above embodiments and various changes and modifications can be made within the spirit and scope of the present invention. Therefore to apprise the public of the scope of the present invention, the following claims are made.

What is claimed is:

1. An apparatus comprising:
   (A) a memory that stores shading correction data, offset amounts and gain amounts respectively corresponding to image sensing sensitivities;
   (B) a sensitivity setting unit adapted to set image sensing sensitivity of an image sensing unit;
   (C) a control unit adapted to control the image sensing unit to perform image sensing operation in non-exposure state to obtain shading correction data when the set image sensing sensitivity is higher than a first sensitivity; and
   (D) a signal processing device adapted to, when the set image sensing sensitivity is higher than the first sensitivity, correct an image sensing signal by using the obtained shading correction data, and when the set image sensing sensitivity is lower than a second sensitivity, said second sensitivity being lower than the first sensitivity, modify the shading correction data stored in said memory using the offset amount and gain amount, stored in said memory, corresponding to the set image sensing sensitivity and correct an image sensing signal by using the modified shading correction data.

2. The apparatus according to claim 1, further comprising said image sensing unit adapted to receive an image of an object to be sensed and convert the image into the image sensing signal.

3. The apparatus according to claim 1, wherein said memory stores, as the shading correction data, one-dimensional reference shading correction data corresponding to part of an image sensing region of an image sensing unit.

4. The apparatus according to claim 3, wherein the one-dimensional reference shading correction data includes data corresponding to a horizontal image sensing region of said image sensing unit.

5. The apparatus according to claim 3, wherein the one-dimensional reference shading correction data includes data corresponding to a vertical image sensing region of said image sensing unit.

6. The apparatus according to claim 1, wherein in a case where the set image sensing sensitivity is between the first and second sensitivities, in a sequential image sensing mode, said control unit causes said image sensing unit to perform image sensing operation in the non-exposure state before image sensing, thereby obtaining the shading correction data, and in a single-shot image sensing mode, causes said image sensing unit to perform image sensing operation in the non-exposure state after image sensing, thereby obtaining the shading correction data, and said signal processing device correct an image sensing signal by using the obtained shading correction data.

7. The apparatus according to claim 1, wherein the apparatus includes an image sensing apparatus.

8. An image processing method comprising:
   determining whether an image sensing sensitivity of an image sensing unit is set higher than a first sensitivity or lower than a second sensitivity, said second sensitivity being lower than the first sensitivity;
   controlling the image sensing unit to perform image sensing operation in non-exposure state to obtain shading correction data when the image sensing sensitivity is higher than the first sensitivity;
   modifying, when the image sensing sensitivity is lower than the second sensitivity, shading correction data stored in a memory using offset amount and gain amount, stored in said memory, corresponding to the image sensing sensitivity; and
   correcting an image sensing signal by using either the shading correction data obtained by performing the image sensing operation in non-exposure state or the modified shading correction data in accordance with the image sensing sensitivity.

9. A computer readable medium which stores a computer program for executing the image processing method defined in claim 8.

* * * * *